(12) United States Patent
Meli

(10) Patent No.: US 10,160,843 B2
(45) Date of Patent: Dec. 25, 2018

(54) NUCLEATION EFFICIENCY OF TALC IN THE FOAMING BEHAVIOUR AND CELLULAR STRUCTURE OF POLYMER-BASED FOAMS

(71) Applicant: IMERYS TALC EUROPE, Toulouse (FR)

(72) Inventor: Gilles Meli, Le Fauga (FR)

(73) Assignee: Imerys Talc Europe, Toulouse (FR)

( * ) Notice: Subject to any disclaimer, the term of this patent is extended or adjusted under 35 U.S.C. 154(b) by 0 days.

(21) Appl. No.: 14/409,658

(22) PCT Filed: Jun. 18, 2013

(86) PCT No.: PCT/EP2013/062660
§ 371 (c)(1),
(2) Date: Dec. 19, 2014

(87) PCT Pub. No.: WO2014/001158
PCT Pub. Date: Jan. 3, 2014

(65) Prior Publication Data
US 2015/0175762 A1   Jun. 25, 2015

(30) Foreign Application Priority Data

Jun. 29, 2012 (EP) .................................. 12290217

(51) Int. Cl.
*C08J 9/00* (2006.01)
*C08K 3/34* (2006.01)
(Continued)

(52) U.S. Cl.
CPC ............ *C08J 9/0066* (2013.01); *B29C 44/04* (2013.01); *C08J 9/122* (2013.01); *C08K 3/34* (2013.01);
(Continued)

(58) Field of Classification Search
CPC ... C08J 9/0066; C08J 2323/10–2323/16; C08J 2325/04–2325/16
See application file for complete search history.

(56) References Cited

U.S. PATENT DOCUMENTS 4,048,272 A    9/1977  Spicuzza, Jr.
6,071,582 A *  6/2000  Tangiku .................. B32B 25/14
                                                      428/36.8
(Continued)

FOREIGN PATENT DOCUMENTS

CN       102304260 A     1/2012
DE   10 2004 008201 A1   9/2005
(Continued)

OTHER PUBLICATIONS

Yildirim, Ismail. Surface free energy characterization of powders. Diss. Virginia Polytechnic Institute and State University, 2001.*
(Continued)

*Primary Examiner* — Michael M Dollinger
*Assistant Examiner* — Christina H Wales
(74) *Attorney, Agent, or Firm* — Finnegan, Henderson, Farabow, Garrett & Dunner, LLP

(57) ABSTRACT

A polymer-based foam composition includes a polymer and up to 20 wt. % talc particles, based on the total weight of the composition. The talc particles include microcrystalline talc.

14 Claims, 33 Drawing Sheets

(51) Int. Cl.
*C08J 9/12* (2006.01)
*B29C 44/04* (2006.01)
*B29K 21/00* (2006.01)
*B29K 23/00* (2006.01)
*B29K 509/00* (2006.01)
*B29L 31/00* (2006.01)

(52) U.S. Cl.
CPC .......... *C08K 3/346* (2013.01); *B29K 2021/00* (2013.01); *B29K 2023/10* (2013.01); *B29K 2509/00* (2013.01); *B29L 2031/00* (2013.01); *C08J 2203/06* (2013.01); *C08J 2205/044* (2013.01); *C08J 2205/046* (2013.01); *C08J 2323/12* (2013.01); *C08J 2325/06* (2013.01)

(56) References Cited

U.S. PATENT DOCUMENTS

| | | | |
|---|---|---|---|
| 2002/0045673 | A1 | 4/2002 | Ochikoshi et al. |
| 2006/0167124 | A1* | 7/2006 | Bernard ............... C08G 18/281 521/163 |
| 2006/0270762 | A1 | 11/2006 | Noel, III |
| 2006/0280892 | A1 | 12/2006 | Davis et al. |
| 2007/0021553 | A1 | 1/2007 | Lichte et al. |
| 2007/0083007 | A1* | 4/2007 | Jacob ..................... C08J 9/0061 525/88 |
| 2007/0100009 | A1* | 5/2007 | Creazzo .............. C03C 23/0075 521/98 |
| 2007/0164466 | A1 | 7/2007 | Scherzer et al. |
| 2007/0270516 | A1* | 11/2007 | Iwamoto ............... B29C 44/445 521/58 |
| 2010/0108351 | A1 | 5/2010 | Pinacci et al. |
| 2011/0028577 | A1 | 2/2011 | Hood et al. |
| 2011/0256333 | A1 | 10/2011 | Lutz et al. |
| 2014/0371369 | A1* | 12/2014 | Kurimoto ............... C08L 23/16 524/426 |

FOREIGN PATENT DOCUMENTS

| | | |
|---|---|---|
| EP | 1 930 368 A1 | 6/2008 |
| EP | 2 053 162 A1 | 4/2009 |
| ES | 2 301 388 | 6/2008 |
| JP | 7-505675 | 6/1995 |
| JP | 2004-122717 | 4/2004 |
| JP | 2004 330464 | 11/2004 |
| JP | 2006-503131 | 1/2006 |
| JP | 2010-270228 | 12/2010 |
| KR | 10-2007-0028736 | 3/2007 |
| KR | 10-0837106 B1 | 6/2008 |
| WO | WO 94/17131 | 8/1994 |
| WO | WO 2008/046938 | 4/2008 |
| WO | WO 2010-065053 A1 | 6/2010 |
| WO | WO 2014-001158 A1 | 1/2014 |

OTHER PUBLICATIONS

"Mechanical properties Used as a reinforcing filler, Imerys talcs improve the mechanical properties of rubber compounds" by Imerys. Accessed at http://www.imerystalc.com/content/bu/Rubber/Products/Mistron_Vapor/ on Mar. 17, 2016.*
"Microcellular Plastics Lab" by Miller et al. Website copyright 2007. Accessed at http://faculty.washington.edu/vkumar/microcel/ on Mar. 17, 2016.*
"Influence of Cell Structure Parameters on the Mechanical Properties of Microcellular Polypropylene Materials" by Gong et al. Published Jul. 6, 2011. J app poly sci, vol. 122, pp. 2907-2914.*
Nayak, N. C. and Tripathy, D. K. (2002), Morphology and physical properties of closed cell microcellular ethylene—octene copolymer: Effect of precipitated silica filler and blowing agent. J. Appl. Polym. Sci., 83: 357-366. doi:10.1002/app.10013.*
Meli, G. "The new micronized talcs: New functions for extrusion and molding applications" in Rubber World, Dec. 2001. (Year: 2001).*
International Search Report and Written Opinion dated Sep. 12, 2013, for International Application No. PCT/EP2013/062660.
Product Information of Mictrotalc IT extra, dated Nov. 19, 2014.
Castillo, Luciano A.; Barbosa, Silvia E.; and Capiati, Numa J., "Influence of talc morphology on the mechanical properties of talc filled polypropylene", J. Polym Res., 2013, pp. 1-9.
Office Action dated Aug. 5, 2015, in related European Patent Application No. 12 290 217.4.
State Intellectual Property Office of China—Search Report dated Jun. 27, 2016, in Chinese Application No. 201380030509.4 (2 pgs.).
Chinese Office Action for CN 201380030509 dated Mar. 8, 2017 (14 pages).
Annual Review on the World's Mineral Resources, Geological Publishing House, Nov. 30, 2010, p. 340, and English translation thereof, (8 pages total).
Extended European Search Report for Application No. 17164191.3-1377, dated Jul. 27, 2017, 9 pages.

* cited by examiner

 
Fig. 1a          Fig. 1b
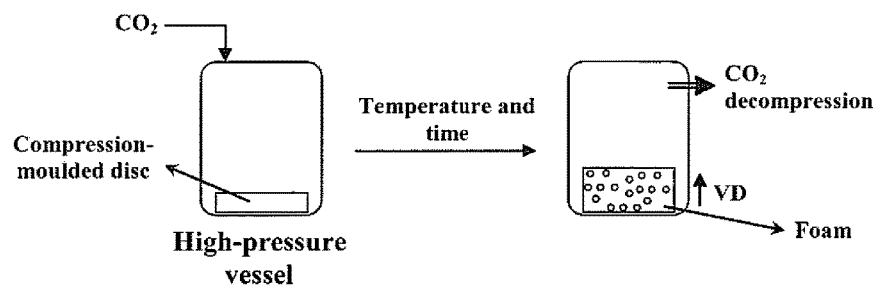
Fig. 2
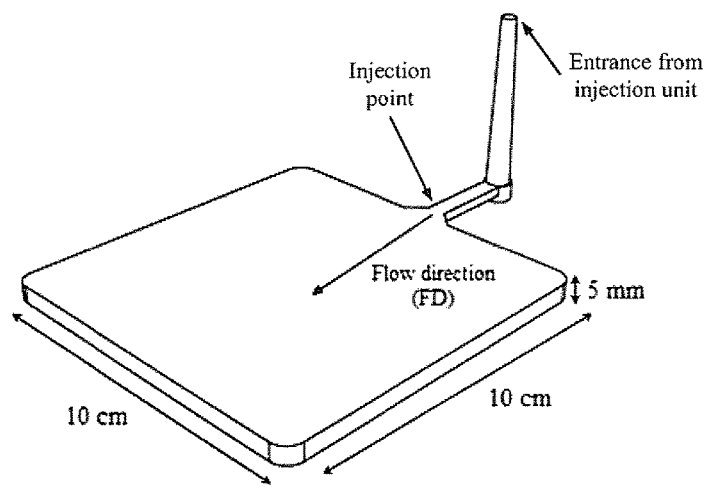
Fig. 3

PP + 0.5% Comparative talc C    PP + 1% Comparative talc C

PP + 0.5% ComparativeTalc D

PP + 0.5% TalcB

NUCLEATION EFFICIENCY OF TALC IN THE FOAMING BEHAVIOUR AND CELLULAR STRUCTURE OF POLYMER-BASED FOAMS

CLAIM FOR PRIORITY

This application is a U.S. national phase entry under 35 U.S.C. § 371 from PCT International Application No. PCT/EP2013/062660, filed Jun. 18, 2013, which claims the benefit of priority of European Patent Application No. 12290217.4, filed Jun. 29, 2012, the subject matter of both of which is incorporated herein by reference.

FIELD OF THE INVENTION

The present invention relates to polymer-based foams having improved cellular structure and using talc as a nucleating agent. The invention further relates to methods of providing such foams and their use.

BACKGROUND OF THE INVENTION

One of the main challenges involving polymer materials lies in the development of increasingly light components with improved properties for use in applications such as food packaging or the automotive industry. A possible strategy combines weight reduction by foaming of a base material with the incorporation of reinforcing and/or functional fillers acting as cell nucleants or promoters. Cell nucleating agents are commonly used in polymeric foaming processes to enhance cell nucleation. With the presence of nucleating agents, heterogeneous nucleation becomes the predominant mode of cell nucleation during polymer foaming processes.

Polypropylene foams are known in the art, but they have reduced stiffness and mechanical strength compared to conventional polypropylene. Increasing oil prices have contributed to increased production costs of plastic resins and finished plastic products. Since plastic resin costs typically amount to 50 to 60% of the total cost of any given plastic product, a reduction of resin amounts in plastics while at the same time maintaining mechanical and other properties of the plastic products is of considerable economic benefit.

WO 2010/065053 A1 describes the use of cell nucleating compositions in the production of polyhydroxyalkanoate foams. A wide range of nucleating agents were used, including a high aspect ratio talc (FlexTalc® 610D). Polyhydroxyalkanoates are biodegradable polymers and mainly of interest for the production of biodegradable films for food packaging. No indications of the properties of the foams obtained, when compared to the unfoamed products are disclosed.

KR 10-0837106 B1 discloses a method for preparing non-crosslinked polypropylene foamed sheets comprising the steps of extruding a mixture 93 to 98 parts by weight of a polypropylene homopolymer with up to 3 parts per weight talc, followed by foaming by injection of 1 to 4 parts by weight of butane gas as a foaming agent. There is no indication regarding the physical properties (such as density, mechanical strength or stiffness) of the finished product.

KR 10-2007-0028736 A discloses rigid foams for automotive interior materials prepared from a composite resin prepared by melt-mixing 5 to 10 parts by weight of a talc with an average particle size of 10 to 13 μm and 0.1 to 0.4 parts by weight of an antioxidant with 100 parts by weight of a resin mixture comprising 90 to 95 parts by weight of a polypropylene resin.

SUMMARY OF THE INVENTION

The present invention is defined in the appended claims.

In one aspect, the present invention relates to polymer-based foam composition comprising a polymer; and up to 20 wt.-% talc particles, based on the total weight of the composition. The polymer-based foam composition according to certain embodiments of the invention is characterised in that the talc particles are microcrystalline talc.

In one embodiment according to the invention, the polymer used for the polymer-based foam composition is a polypropylene polymer, such as a polypropylene homopolymer. According to one embodiment of the present invention, the polymer may be the major component of the polymer-based foam composition (i.e. more than 50% by weight of the composition).

According to certain embodiments of the present invention, the polymer-based foam composition may be produced by either a two-step extrusion-mixing and foaming process, or a single-step injection-moulding foaming process, such as the Mucell® foaming process. These processes will be explained in more detail in the Examples section of the present description.

A second aspect of the present invention is the use of the polymer-based foam compositions in the production of food packaging products and/or in the production of plastic parts for automotive vehicles, as well as in packaging products in general, thermal and/or noise insulation foams, pipes, consumer goods and appliances.

A third aspect of the present invention provides compositions and products comprising a polymer-based foam composition according to certain embodiments of the present invention. These products may be for example food packaging products, or structural parts for the automotive industry.

A fourth aspect of the present invention provides methods for forming the polymer-based foam compositions involving either a two-step extrusion-mixing and foaming process, or a single-step extrusion moulding and foaming process, such as for example the Mucell® process.

The nucleated polymer foam of certain embodiments of the invention develops a good nucleating effect which allows the density of the material to be decreased without negatively impacting on the overall mechanical properties and thus allows the material performance to come close to that of the unfoamed material.

SHORT DESCRIPTION OF THE FIGURES

Exemplary embodiments of the invention will be further illustrated by reference to the following figures:

FIG. 1a shows a Scanning Electron Microscope (SEM) picture of a talc having a microcrystalline structure;

FIG. 1b shows a Scanning Electron Microscope (SEM) picture of a talc having a macrocrystalline structure;

FIG. 2 shows a scheme of the a $CO_2$-dissolution foaming process as used in a two-step extrusion-mixing and foaming process;

FIG. 3 shows a diagram of foam samples produced using a single-step injection-moulding foaming process;

DETAILED DESCRIPTION OF THE INVENTION

Figure 4:
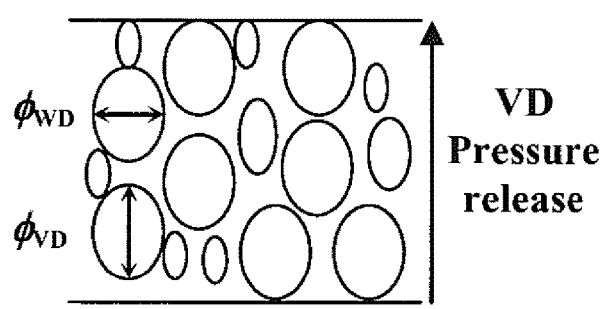
FIG. 4 shows schematically the orientation of the cells and their cells sizes φD and φWD.

The present invention according to the appended claims provides for polymer foams in which the considerable reduction of polymer stiffness and mechanical strength caused by the incorporation of a high gas volume fraction is at least partially compensated by the incorporation of microcrystalline talc, acting both as a nucleating agent and as a reinforcing filler.

In general, the individual platelet size, i.e. the median diameter as measured by the Sedigraph method as described in the experimental section below, of an individual talc platelet (a few thousand elementary sheets) can vary from approximately 1 μm to over 100 μm, depending on the conditions of formation of the deposit. The individual platelet size determines the lamellarity of the talc. A highly lamellar talc will have large individual platelets, whereas a microcrystalline talc will have small platelets. Although all talcs may be termed lamellar, their platelet size differs from one deposit to another. Small crystals provide a compact, dense ore, known as microcrystalline talc. Large crystals come in papery layers, known as macrocrystalline talc. Known microcrystalline talc deposits are located in Montana (Yellowstone) and in Australia (Three Springs). In a microcrystalline structure, talc elementary particles are composed of small plates compared to macrocrystalline structures, which are composed of larger plates. FIGS. 1a and 1b show Scanning Electron Microscope (SEM) pictures of talcs having microcrystalline and macrocrystalline structures respectively.

According to certain embodiments of the present invention, microcrystalline talcs are suited for use as nucleants and/or fillers in the production of polymer foams. The polymer foams may be selected from thermoplastics, thermoplastic elastomers foamed with physical blowing agents and polystyrene or polypropylene foams. Polypropylene foams are suited for use in the food packaging and the automotive industries. Polystyrene foams are suitable for use e.g. as packaging products or as insulating materials.

Furthermore, according to certain embodiments of the present invention provides improved properties, irrespective of whether they were produced using a two-step extrusion-mixing and foaming process, or a single-step injection-moulding foaming process. In fact it has been found that when a single-step injection-moulding foaming process is used, advantageous physical properties are obtained in both the flow direction (FD) of the moulding and the transversal direction (TD) to the moulding direction.

According to one embodiment of the present invention, the polymer may be the major component of the polymer-based foam composition, i.e. present in an amount greater than 50% by weight of the composition. In embodiments, the polymer may be present in an amount (by weight of the composition) of 55% or more, 60% or more, 70% or more, 80% or more, 90% or more, 95%, or 99% or more.

The polymer based foam compositions according to certain embodiments of the present invention may be polypropylene foams, such as polypropylene homopolymer foams, loaded with varying concentrations of microcrystalline talc. For example, the microcrystalline talc may be present in an amount of up to 20 wt.-%, or of up to 10 wt.-%, based on the total weight of the composite (unfoamed) material, or in an amount of up to 5 wt.-%, or in an amount ranging from 0.1 wt.-% to 5 wt.-%.

The microcrystalline talc comprised in the polymer foams according to certain embodiments of the present invention may have a $d_{50}$ by Sedigraph ranging from 0.5 to 10 μm. For example, the $d_{50}$ of the microcrystalline talc may be ranging from 1.0 to 7.5 μm, such as 1.0 to 5 μm, or 3.0 to 4.5 μm. The Sedigraph method is described in the experimental section below Furthermore, the microcrystalline talcs comprised in the polymer foams according to certain embodiments of the present invention may have a surface BET area in the range of 5 to 25 $m^2 \cdot g^{-1}$, such as for example from 8 to 25 $m^2 \cdot g^{-1}$, or from 10 to 15 $m^2 \cdot g^{-1}$, or from 10 to 12 $m^2 \cdot g^{-1}$. As used herein, the surface BET area is the specific surface area measured according to DIN ISO 9277.

Moreover, the microcrystalline talcs comprised in the polymer foams according to certain embodiments of the present invention may have an aspect ratio according to Jennings theory in the range of from 3 to 25, from 5 to 20, from 9 to 15, or from 10 to 15. The Jennings theory (or Jennings approximation) of aspect ratio is based on research performed by W. Pabst, E. Gregorova, and C. Berthold, Department of Glass and Ceramics, Institute of Chemical Technology, Prague, and Institut für Geowissenschaften, Universität Tüubingen, Germany, as described e. g. in Pabst W., Berthold C.: Part. Part. Syst. Charact. 24 (2007), 458.

In certain embodiments, the microcrystalline talc comprised in the polymer-based foam composition may have an average particle size $d_{50}$ by Sedigraph of 0.5 to 10 μm, and an aspect ratio according to Jennings theory of 3 to 25, and a surface BET area of 5 to 25 $m^2 \cdot g^{-1}$. In other embodiments, the microcrystalline talc comprised in the polymer-based foam composition may have average particle size $d_{50}$ by Sedigraph of 3 to 4.5 μm, an aspect ratio according to Jennings theory of 9 to 15, and a surface BET area of 10 to 15 $m^2 \cdot g^{-1}$.

The polymer-based foam compositions according to certain embodiments of the present invention may have average cell sizes of 150 μm or less, or 100 μm or less, or 80 μm or less, or even 40 μm or less, in either the vertical direction ($\varphi_{VD}$), or the width direction ($\varphi_{WD}$) or both. The ratio $\varphi_{WD}/\varphi_{VD}$ of the average cell size in a width direction $\varphi_{WD}$ to the average cell size in a vertical direction $\varphi_{VD}$ may be 0.7 or more, such as for example 0.8 or more, or even 0.9 or more.

The polymer-based foam compositions according to certain embodiments of the present invention may have cell concentrations ($N_f$) in the foam of $1 \times 10^5$ cells·$cm^{-3}$ or more, such as for example $1 \times 10^6$ cells·$cm^{-3}$ or more, or even $5 \times 10^6$ cells·$cm^{-3}$ or more, or in some cases even $1 \times 10^7$ cells·$cm^{-3}$ or more. The polymer-based foam composition according to certain embodiments of the present invention may contain $10^6$ or more cells per $cm^3$ ($N_f$).

The polymer-based foam compositions according to certain embodiments of the present invention may have relative densities, when compared to the respective unfoamed base materials, ranging from 0.40 to 0.95, such as ranging from 0.55 to 0.90.

In the polymer-based foam compositions according to certain embodiments of the present invention the elastic storage modulus may be influenced by the foaming, when compared to the elastic storage modulus of the unfoamed product, such as for example, specific elastic storage modulus of polymer based foams filled with 5% microcrystalline talc (1052.7 MPa·cm$^3$/g) may be 13% higher than unfilled polymer-based foamed (926.8 MPa·cm$^3$/g) for almost the same weight reduction (~15%). Alternatively, for example, a specific elastic storage modulus of polymer based foamed filled with 5% of microcrystalline talc (1052.7 MPa·cm$^3$/g) may be 9% lower than unfilled and unfoamed polymer (1148.6 MPa·cm$^3$/g) but with 16% weight reduction achieved. In certain embodiments, the variation parameter "n", which measures the relative effect of the foaming on a physical property in relation to the corresponding unfoamed product, is 1.5 or lower, such as e.g. 1.4 or lower.

EXAMPLES

Tests and analytical results of unfilled and filled polypropylene and polystyrene foams prepared according to a two-step extrusion-mixing and foaming process and a single-step injection-moulding foaming process are described separately. As mentioned above, talc-nucleated polypropylene and polystyrene foams prepared according to any of these processes form part of the present invention.

Two-Step Extrusion-Mixing and Foaming Process:

Compounding: All materials were prepared by melt-mixing the polypropylene (Polypropylene homopolymer "Moplen HP501L", provided by LyondellBasell) with the different talcs (Comparative Talcs A to D, and Talcs A and B) using a co-rotating twin-screw extruder "Collin Kneter 25×36D". The extrusion temperature profile and screw speeds as shown in Table 1 were used:

TABLE 1

Extrusion temperature profile and screws rotating speed used in the preparation of the several polypropylene-talc composites:

| Extrusion parameters | Values |
| --- | --- |
| $T_{Zone\ 1}$ (° C.) | 140 |
| $T_{Zone\ 2}$ (° C.) | 155 |
| $T_{Zone\ 3}$ (° C.) | 165 |
| $T_{Zone\ 4}$ (° C.) | 175 |
| $T_{Zone\ 5}$ (° C.) | 180 |
| $T_{Zone\ 6}$ (° C.) | 180 |
| $T_{Zone\ 7}$ (° C.) | 180 |
| $T_{die}$ (° C.) | 180 |
| Screw speed (rpm) | 120 |

A range of talcs were tested for their potential use as fillers/nucleants in polymer foams. They are listed in Table 2, with their respective morphologies and main physical properties. Unless otherwise stated, the particle size properties referred to herein for the inorganic particulate materials were measured according to methods known to the skilled person in the art. Unless otherwise mentioned, the properties were measured by sedimentation of the particulate material in a fully dispersed condition in an aqueous medium using a "Sedigraph 5100" machine as supplied by Micrometrics Instruments Corporation, Norcross, Ga., USA, referred to herein as a "Micrometrics Sedigraph 5100 unit". Such a machine provides measurements and a plot of the cumulative percentage by weight of particles having a size, referred to in the art as the 'equivalent spherical diameter' (e.s.d), less than given e.s.d values. The mean particle size $d_{50}$ given herein is the value determined in this way of the particle e.s.d at which there are 50% by weight of the particles which have an equivalent spherical diameter less than that $d_{50}$ value.

TABLE 2

Main characteristics of the different talc grades:

| Type of talc | Morphology | $d_{50}$ (μm)* | BET (m$^2$/g) |
| --- | --- | --- | --- |
| Comparative Talc A | Lamellar | 4.9 | 4.2 |
| Comparative Talc B | Lamellar | 2.0 | 8.0 |
| Comparative Talc C | Highly lamellar | 3.7 | 6.5 |
| Talc A | Microcrystalline | 3.4 | 11.0 |
| Comparative Talc D | Highly lamellar | 0.7 | 19.0 |
| Talc B | Microcrystalline | 1.1 | 21.3 |

Comparative Talcs A and B polypropylene composites were prepared by diluting a polypropylene-talc masterbatch with a nominal amount of talc of 2 wt.-% to nominal talc concentrations of 0.5, 1, 1.3 and 1.7 wt.-%. In the case of Comparative Talcs C and D, and Talcs A and B composites, 1 wt.-% talc-polypropylene composites were prepared by diluting a polypropylene-talc masterbatch with a nominal amount of talc of 5 wt.-%.

In order to provide full homogenisation, all composites were prepared by processing the material twice inside the twin-screw extruder. For comparison purposes, polypropylene homopolymer without talc was also processed twice using the same temperature profile. At the exit of the circular extrusion die (Ø=3 mm) all materials were cooled using a water bath and pelletised prior to solid foaming precursor preparation.

Solid foaming precursor preparation: In order to prepare solid precursors for foaming, the different pelletised materials obtained at the end of the compounding stage were compression-moulded in a hot-plate press IQAP-LAP PL-15 by placing the pellets into a 3.5 m thick circular steel mould (Ø=74 m) using the conditions shown in Table 3.

TABLE 3

Solid foaming precursor compression-moulding conditions:

| Upper plate temperature (° C.) | Lower plate temperature (° C.) | Melting time (min) | Pressure (bar) | Time under pressure (min) | Cooling time under pressure (min) |
| --- | --- | --- | --- | --- | --- |
| 195 | 195 | 8 | 40 | 6 | 10 |

Polypropylene-talc composites were provided, comprising the various talcs shown in Table 2 at varying concentrations. The actual talc content in the composites was determined by calcination as the average of three values obtained according to UNE-EN ISO 3451-1. A sample weight of approximately 5.0 g was used and the talc content was calculated according to the following equation:

$$\text{talc content (in wt.-\%)} = \frac{M_b - M_0}{M_c - M_0} \cdot 100,$$

wherein $M_0$ is the weight of the empty crucible, $M_c$ is the weight of the crucible with the sample prior to calcination and $M_b$ is the weight of the crucible with the burned sample. The various composites used are shown in Table 4. Early tests indicated that polypropylene compositions comprising Talc A provided potentially promising results, so a broader range of materials comprising this talc was tested.

TABLE 4

Talc content of the several polypropylene-talc composites determined by calcination at 600° C. according to UNE-EN ISO 3451-1

| Example | Material | Type of talc | Talc content (wt %) |
|---|---|---|---|
| Comp. 1 | PP + 0.5% Comp. Talc A | Comp. Talc A | 0.7 ± 0.0 |
| Comp. 2 | PP + 1% Comp. Talc A | | 1.4 ± 0.0 |
| Comp. 3 | PP + 1.3% Comp. Talc A | | 1.6 ± 0.0 |
| Comp. 4 | PP + 1.7% Comp. Talc A | | 1.7 ± 0.0 |
| Comp. 5 | PP + 0.5% Comp. Talc B | Comp. Talc B | 0.4 ± 0.0 |
| Comp. 6 | PP + 1% Comp. Talc B | | 0.7 ± 0.0 |
| Comp. 7 | PP + 1.3% Comp. Talc B | | 0.8 ± 0.0 |
| Comp. 8 | PP + 1.7% Comp. Talc B | | 1.0 ± 0.0 |
| Comp. 9 | PP + 0.5% Comp. Talc C | Comp. Talc C | 0.5 ± 0.0 |
| Comp. 10 | PP + 1% Comp. Talc C | | 1.1 ± 0.0 |
| 1 | PP + 0.5% Talc A | Talc A | 0.5 ± 0.0 |
| 2 | PP + 1% Talc A | | 1.0 ± 0.0 |
| 3 | PP + 2% Talc A | | 1.6 ± 0.1 |
| 4 | PP + 5% Talc A | | 5.2 ± 0.0 |
| 5 | PP + 10% Talc A | | 10.3 ± 0.1 |
| Comp. 11 | PP + 0.5% Comp. Talc D | Comp. Talc D | 0.6 ± 0.0 |
| Comp. 12 | PP + 1% Comp. Talc D | | 1.0 ± 0.0 |
| 6 | PP + 0.5% Talc B | Talc B | 0.5 ± 0.0 |
| 7 | PP + 1% Talc B | | 1.0 ± 0.0 |

Foaming was performed by $CO_2$-dissolution: The solid foaming precursor discs were foamed using a gas dissolution batch-foaming process with $CO_2$ as the physical blowing agent (see scheme displayed in FIG. 2). Foams were obtained by saturating the discs with $CO_2$ in a high-pressure vessel, the saturated sample being foamed in one-step by applying a pressure drop. Pressurised at 200 bar and 155° C. (saturation temperature) for 30 min, the $CO_2$-saturated discs were foamed while cooling from the saturation temperature to the foaming temperature (135° C.), and by decompressing from 180 bar (foaming pressure) to 0 bar, i.e. applying a pressure drop of 180 bar. The foaming conditions used to prepare the foams are presented in Table 5:

TABLE 5

Foaming conditions used to prepare the foams by one-step $CO_2$-dissolution:

| Saturation temperature (° C.) | Saturation time (min)* | Foaming temperature (° C.) | Foaming pressure (bar) | Pressure drop (bar) |
|---|---|---|---|---|
| 155 | 30 | 135 | 180 | 180 |

*Time at saturation temperature.

The densities of the various composites (foamed and unfoamed) were measured according to ISO 845, without removing the outer skins of the foamed specimens generated during the $CO_2$-foaming process. The results are displayed in Table 6. The relative densities refer to the ratio of the density between the respective foamed and the unfoamed products $\frac{\rho_f}{\rho_s}$.

TABLE 6

Absolute and relative densities of unfoamed and foamed polypropylenes formed according to the two-step extrusion-mixing and foaming process:

| Example | Talc content (wt.- %) | Unfoamed density (g · cm$^{-3}$) | Foamed density (g · cm$^{-3}$) | Relative density $\frac{\rho_f}{\rho_s}$ |
|---|---|---|---|---|
| Comp. 1 | 0.7 ± 0.0 | 0.905 | 0.621 | 0.69 |
| Comp. 2 | 1.4 ± 0.0 | 0.920 | 0.591 | 0.64 |
| Comp. 3 | 1.6 ± 0.0 | 0.916 | 0.574 | 0.63 |
| Comp. 4 | 1.7 ± 0.0 | 0.916 | 0.522 | 0.57 |
| Comp. 5 | 0.4 ± 0.0 | 0.915 | 0.634 | 0.69 |
| Comp. 6 | 0.7 ± 0.0 | 0.920 | 0.675 | 0.73 |
| Comp. 7 | 0.8 ± 0.0 | 0.916 | 0.649 | 0.71 |
| Comp. 8 | 1.0 ± 0.0 | 0.924 | 0.479 | 0.52 |
| Comp. 9 | 0.5 ± 0.0 | 0.904 | 0.557 | 0.62 |
| Comp. 10 | 1.1 ± 0.0 | 0.917 | 0.664 | 0.72 |
| 1 | 0.5 ± 0.0 | 0.909 | 0.655 | 0.72 |
| 2 | 1.0 ± 0.0 | 0.910 | 0.557 | 0.61 |
| 3 | 1.6 ± 0.0 | 0.924 | 0.571 | 0.62 |
| 4 | 5.2 ± 0.0 | 0.949 | 0.458 | 0.48 |
| 5 | 10.3 ± 0.0 | 0.980 | 0.645 | 0.66 |
| Comp. 11 | 0.6 ± 0.0 | 0.904 | 0.431 | 0.48 |
| Comp. 12 | 1.0 ± 0.0 | 0.915 | 0.560 | 0.61 |
| 6 | 0.5 ± 0.0 | 0.914 | 0.571 | 0.63 |
| 7 | 1.0 ± 0.0 | 0.917 | 0.527 | 0.57 |

Single-Step Injection-Moulding Foaming Process:

The production of foamed polypropylene was carried out using foaming by injection-moulding physical foaming known as the Mucell® foaming process. Polypropylene homopolymer "Moplen EP300K", provided by LyondellBasell, was foamed using supercritical $N_2$ (0.7 to 0.8 wt.-%) as the physical blowing agent, to obtain square plates of dimensions 10 cm×10 cm×5 mm. The talc incorporated was Talc A (see Table 2), in concentrations of 1, 2 and 5 wt.-%. The injection-moulding machine "Engel Victory 110" has a closing force of 110 tons, maximum plasticising volume of 250 cm$^3$, maximum injection pressure of 2500 bar, and a screw diameter of 40 mm. The temperatures of the injection unit are shown in Table 7. The counter back-pressure during injection is 20 MPa, the mould temperature 35° C. and the cooling time inside the mould 35 to 45 s. The injection speed was 0.200 m·s$^{-1}$ for examples 8 to 19 and 0.065 m·s$^{-1}$ in the case of example 8*.

TABLE 7

Injection unit temperatures

| Zone | Temperature (° C.) |
|---|---|
| 1 | 190 |
| 2 | 210 |
| 3 | 215 |
| 4 | 220 |
| 5 (injection temperature) | 230 |

Various foams were produced using the above described process. The polymer dosages and injection speeds for each foaming condition are shown in Table 8:

TABLE 8

Polymer dosages and injection speeds for each foaming condition

| Condition | Final weight reduction (%) | Polymer dosage (cm$^3$) | Polymer injection speed (m/s) |
|---|---|---|---|
| Solid | — | 65.0 | 0.442 |
| Foam 1 | 15 to 16 | 48.5 | 0.200 |

TABLE 8-continued

Polymer dosages and injection speeds for each foaming condition

| Condition | Final weight reduction (%) | Polymer dosage (cm³) | Polymer injection speed (m/s) |
|---|---|---|---|
| Foam 2 | 27 | 42.0 | 0.120 |
| Foam 3 | 34 | 38.0 | 0.095 |
| Foam 4 | 39 | 35.0 | 0.065 |

The various foams produced from the polypropylene comprising 1, 2 and 5 wt.-% Talc A, and their unfoamed equivalents had the densities shown in Table 9. The densities were measured according to ISO 845.

TABLE 9

Densities of unfoamed and foamed polypropylenes:

| Example | Material | Foam code | Density (g · cm⁻³) | Relative density | Weight reduction (%) |
|---|---|---|---|---|---|
| — | Unfilled | Solid | 0.864 | 1 | 0 |
| Comp. 13 | polypropylene | Foam 1 | 0.774 | 0.86 | 14.0 |
| Comp. 14 | | Foam 2 | 0.671 | 0.75 | 25.5 |
| Comp. 15 | | Foam 3 | 0.605 | 0.67 | 32.7 |
| Comp. 16 | | Foam 4 | 0.556 | 0.62 | 38.3 |
| — | polypropylene + | Solid | 0.905 | 1 | 0 |
| 8 | 1 wt.-% Talc | Foam 1 | 0.746 | 0.85 | 15.4 |
| 9 | A | Foam 2 | 0.649 | 0.74 | 26.4 |
| 10 | | Foam 3 | 0.586 | 0.66 | 33.6 |
| 11 | | Foam 4 | 0.536 | 0.61 | 39.2 |
| — | polypropylene + | Solid | 0.884 | 1 | 0 |
| 12 | 2 wt.-% Talc | Foam 1 | 0.748 | 0.85 | 15.3 |
| 13 | A | Foam 2 | 0.650 | 0.73 | 26.5 |
| 14 | | Foam 3 | 0.584 | 0.66 | 33.9 |
| 15 | | Foam 4 | 0.538 | 0.61 | 39.2 |
| — | polypropylene + | Solid | 0.881 | 1 | 0 |
| 16 | 5 wt.-% Talc | Foam 1 | 0.760 | 0.84 | 16.1 |
| 17 | A | Foam 2 | 0.665 | 0.73 | 26.6 |
| 18 | | Foam 3 | 0.599 | 0.66 | 33.8 |
| 19 | | Foam 4 | 0.547 | 0.60 | 39.6 |

Foam Characterisation:

The cellular structure of the various foams produced according to the Examples and Comparative Examples described above was studied using a "JEOL JSM-5610" scanning electron microscope (SEM) from samples cryogenically fractured using liquid nitrogen and made conductive by sputter deposition of a thin layer of gold. The average cell size ($\varphi$) and cell density ($N_f$) were directly obtained from low-magnification micrographs using the intercept counting method [G. L. A. Sims and C. Khunniteekool, Cell size measurement of polymeric foams, Cellular Polymers, 13, 137 (1994)]. In particular, $N_f$ was determined according to the following equation:

$$N_f = \left(\frac{n}{A}\right)^{\frac{3}{2}} \cdot \left(\frac{\rho_s}{\rho_f}\right),$$

wherein n is the number of cells per area A (in cm²), and $\rho_s$ and $\rho_f$ are respectively the solid and foam densities.

Two different cell sizes were determined, $\varphi_{VD}$, with VD representing the vertical direction, in this case being the cell size in the direction of pressure release, and $\varphi_{WD}$ with WD representing the width direction, as represented in FIG. 4.

Figure 5:
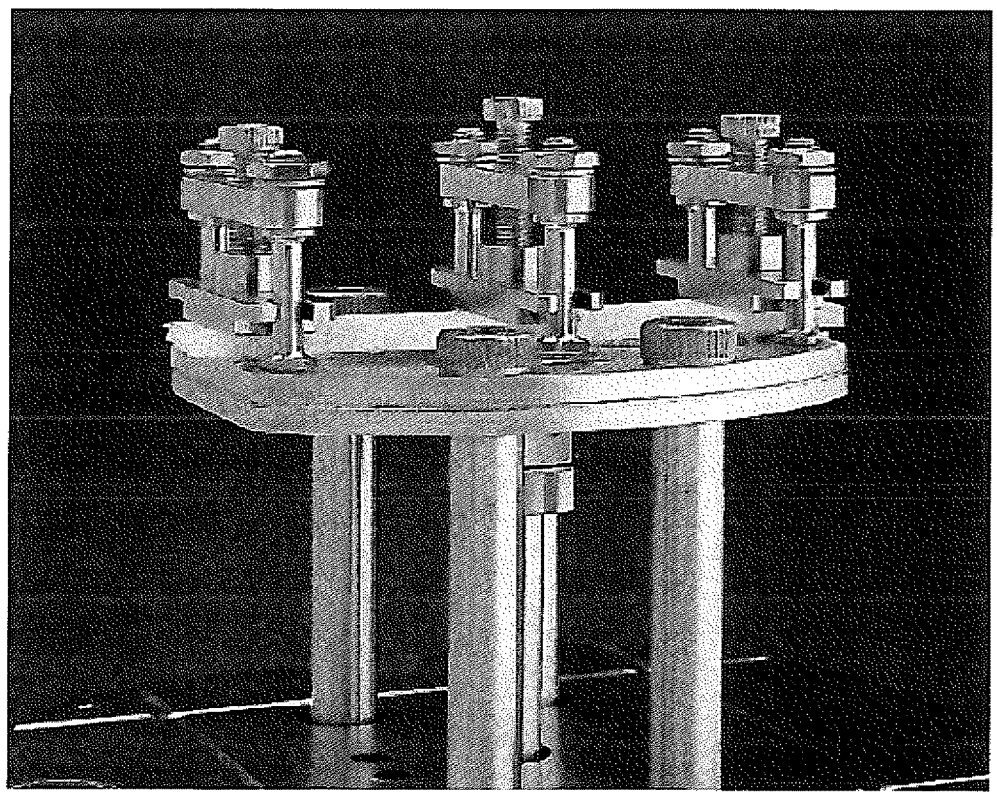
FIG. 5 shows a single cantilever clamp, as used for the DMTA characterisation of the samples.
Figure 6:
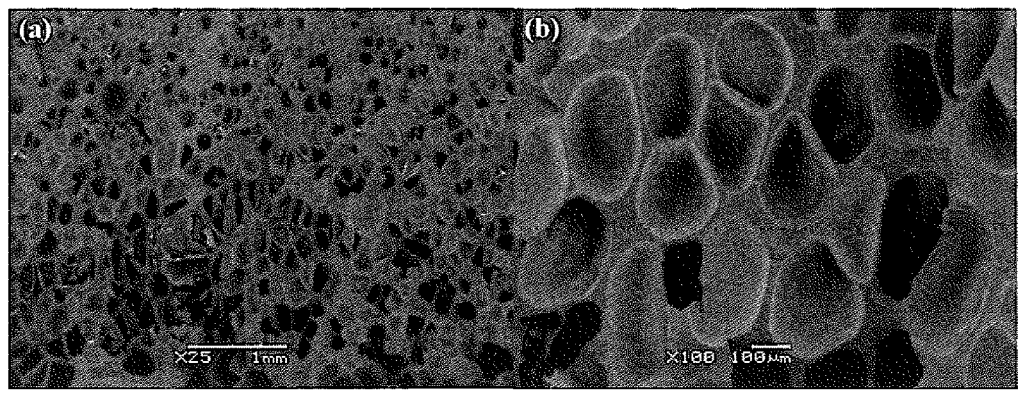
FIGS. 6 to 21 show SEM micrographs of the foams according to Examples 1 to 7 and comparative Examples 1 and 8 to 12 at various scales.
Figure 7:
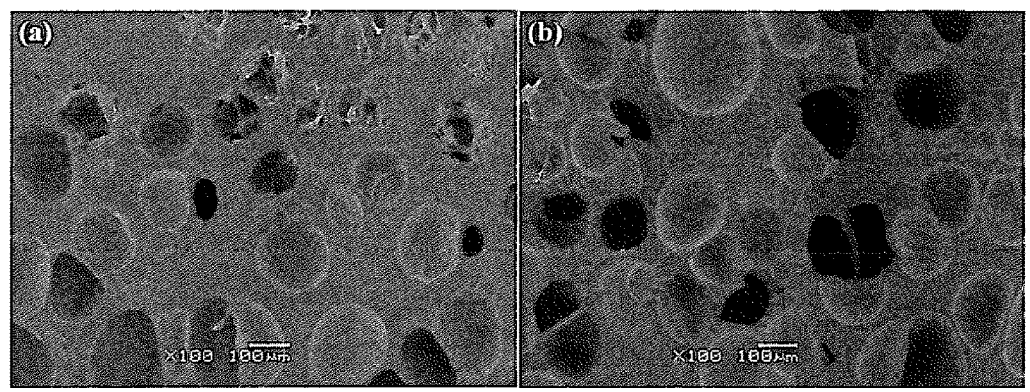
Figure 8:
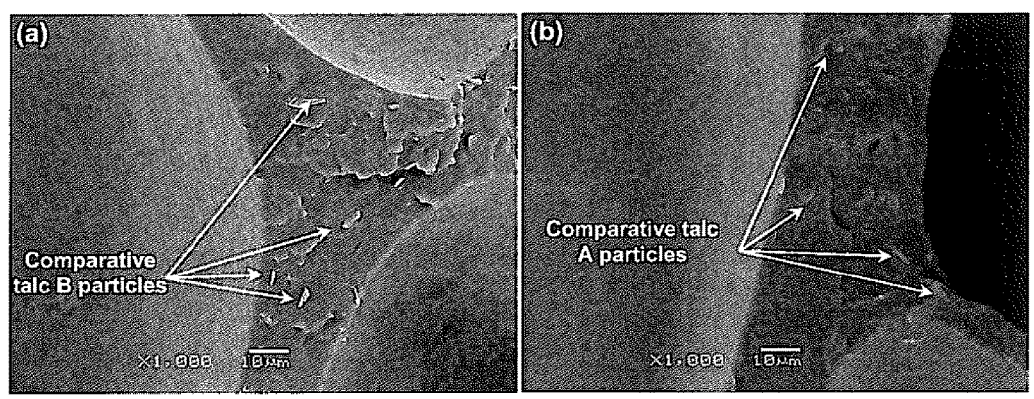
Figure 9:
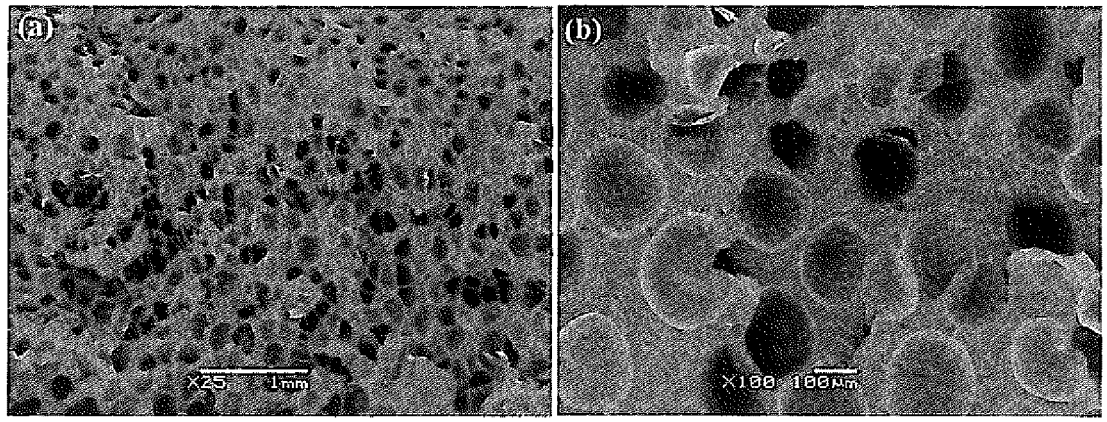
Figure 10:
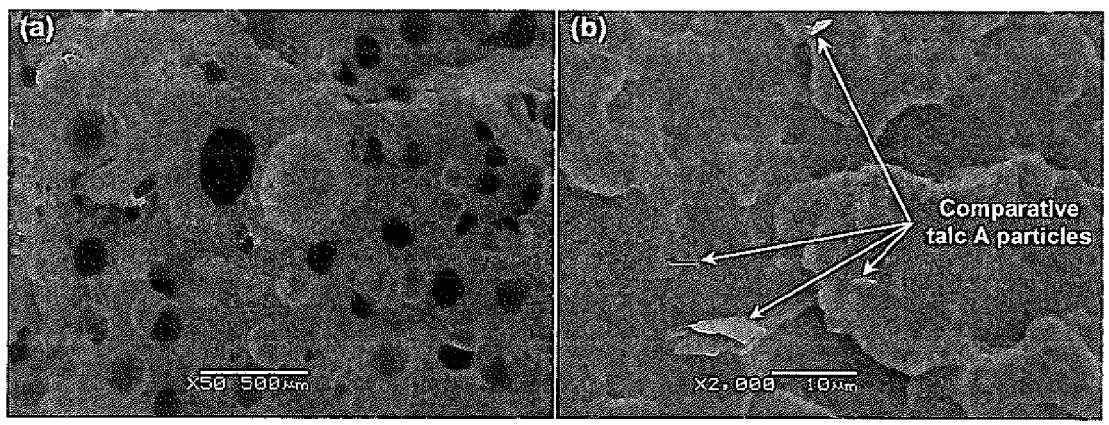
Figure 11:
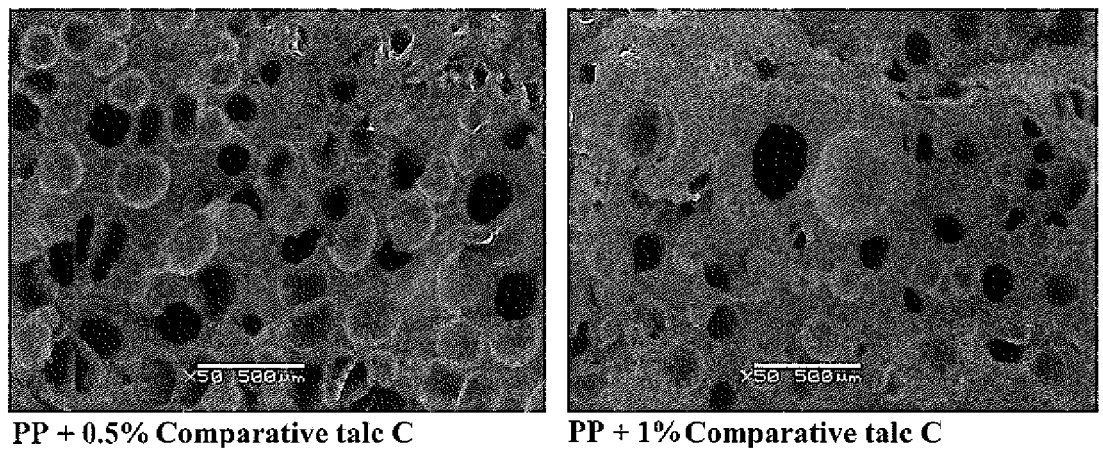
Figure 12:
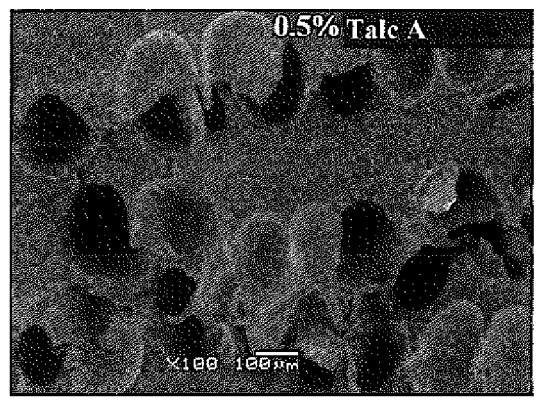

The various foams produced according to the Examples and Comparative Examples described above were further characterised using Dynamic Mechanical Thermal Analysis (DMTA) characterisation. The equipment used was the "Dynamic Mechanical Thermal Analysed DMA Q800" provided by TA Instruments. The method used was a DMA multi-frequency strain with a strain control of 0.02%. The samples tested had a rectangular geometry and were held by a single cantilever clamp, as shown in FIG. 5. The samples were tested after removing the outer skin generated during foaming and had a thickness of 2.8 mm, a width of 13.0 mm and a length of 35.0 mm, with a span length of 17.5 mm.

The elastic storage modulus E of the materials was determined according to the following equation:

$$E = \frac{K_S}{F_C} \cdot \frac{L^3}{12I} \cdot \left(1 + \frac{12}{5} \cdot (1+v) \cdot \left(\frac{t}{L}\right)^2\right),$$

wherein $K_s$ represents the measured stiffness, L the sample length, v Poisson's ratio, and t the sample's thickness. I is the moment of inertia of the sample, represented by $$I = \frac{w \cdot t^3}{12},$$

w being the sample width, and $F_C$ is a clamping correction factor, defined by:

$$F_C = 0.7616 - 0.02712 \cdot \sqrt{\frac{L}{t}} + 0.1083 \cdot \ln\left(\frac{L}{t}\right).$$

The elastic storage modulus E would then be analysed according to the Gibson-Ashby model, which defines parameter n according to the relative elastic storage moduli and densities of the materials as follows:

$$\frac{E_f}{E_s} = \left(\frac{\rho_f}{\rho_s}\right)^n,$$

wherein n is a measure of the deterioration of the mechanical properties of a foam compared to its unfoamed equivalent. As used herein, "n" represents the variation of a given property of a foam (such as elastic modulus or the strength) with that of the respective base solid, relative to the foam density. Conventionally it is accepted that typically, "n" takes a value ranging from 1 and to 2. "n" is closely related to the cellular structure, its value being close to 1 if the material presents a closed-cell type of cellular structure with average cell sizes of a few micrometers (microcellular foams). If n=1, the variation of the properties of the foam with that of the solid with varying density is linear (e.g. a 20% density reduction will result in a 20% reduction of the measured property). "n" tends to increase with increasing cell size and/or cell connectivity. Generally speaking, it is recognised that open-cell foams have "n" values close to 2, although a value of n=2 does not necessary mean that the cellular structure is fully open-celled.

Results:

The cellular structures of the various foams produced according to the two-step extrusion-mixing and foaming process were measured according to the above mentioned procedure and are shown in Table 10:

TABLE 10

Cellular structures of polypropylene-talc foams produced according to the two-step extrusion-mixing and foaming process:

| Example | Talc content (wt %) | Relative density | $\varphi_{VD}$ (μm) | $\varphi_{WD}$ (μm) | $N_f$ (cells · cm$^{-3}$) | FIG. |
|---|---|---|---|---|---|---|
| PP | 0 | 0.56 | 267.6 ± 8.0 | 155.9 ± 7.8 | 2.67 × 10$^5$ | 6 |
| Comp. 1 | 0.7 ± 0.0 | 0.69 | 159.3 ± 3.2 | 119.9 ± 3.6 | 2.30 × 10$^5$ | 7, 8 |
| Comp. 2 | 1.4 ± 0.0 | 0.64 | 170.5 ± 3.4 | 164.0 ± 3.3 | 3.00 × 10$^5$ | 9 |
| Comp. 3 | 1.6 ± 0.0 | 0.63 | 154.1 ± 3.1 | 131.7 ± 3.9 | 3.10 × 10$^5$ | |
| Comp. 4 | 1.7 ± 0.0 | 0.57 | 153.5 ± 3.1 | 126.7 ± 2.7 | 3.40 × 10$^5$ | |
| Comp. 8 | 1.0 ± 0.0 | 0.52 | 170.6 ± 3.4 | 152.8 ± 4.6 | 3.15 × 10$^5$ | 8, 9 |
| Comp. 9 | 0.5 ± 0.0 | 0.62 | 200.4 | 178.4 | 1.08 × 10$^5$ | 10, 11 |
| Comp. 10 | 1.1 ± 0.0 | 0.72 | 155.6 ± 3.1 | 137.8 ± 2.8 | 1.17 × 10$^5$ | 11 |
| 1 | 0.5 ± 0.0 | 0.72 | 180.2 | 180.2 | 2.95 × 10$^4$ | 12, 13 |
| 2 | 1.0 ± 0.0 | 0.61 | 187.3 ± 3.7 | 143.9 ± 2.0 | 2.44 × 10$^5$ | 13, 14 |
| 3 | 1.6 ± 0.0 | 0.62 | 139.8 | 115.0 | 2.71 × 10$^5$ | 13, 15 |
| 4 | 5.2 ± 0.0 | 0.48 | 99.0 | 97.7 | 7.00 × 10$^5$ | 13, 16 |
| 5 | 10.3 ± 0.0 | 0.66 | 146.0 | 131.6 | 2.07 × 10$^5$ | 13, 17 |
| Comp. 11 | 0.6 ± 0.0 | 0.48 | 180.2 | 116.8 | 6.51 × 10$^5$ | 18 |
| Comp. 12 | 1.0 ± 0.0 | 0.61 | 190.2 ± 3.8 | 163.1 ± 3.3 | 1.21 × 10$^5$ | 19 |
| 6 | 0.5 ± 0.0 | 0.63 | 184.4 | 126.3 | 1.69 × 10$^5$ | 20 |
| 7 | 1.0 ± 0.0 | 0.57 | 194.9 ± 3.9 | 143.9 ± 2.9 | 2.68 × 10$^5$ | 21 |

The cellular structures of the various foams produced according to the two-step extrusion-mixing and foaming process are shown in FIGS. 6 to 21

As can be seen, the incorporation of talc resulted in foams with lower average cell sizes (cell size reduction from the 268 μm of the unfilled polypropylene foams to the around 170 μm of the polypropylene foams with Comparative Talc A and Comparative Talc B—see Comparative Examples 1 to 4 and 8 shown in Table 10) and higher cell densities (increase from 2.67×10$^5$ cells·cm$^{-3}$ to up to 3.40×10$^5$ cells·cm$^{-3}$), hence demonstrating the heterogeneous cell nucleation effect promoted by the talc particles. Also, polypropylene-talc foams displayed a more isotropic-like cellular structure when compared to the unfilled polypropylene foams (compare FIG. 6 with FIGS. 7 and 9).

The effect of talc concentration in the cellular structure of polypropylene foams in terms of the average cell size, cell density and cell aspect ratio, was assessed using Comparative Talc A. As can be seen by the results shown in Table 10, finer cellular structures were obtained with increasing talc content from 0.5 wt.-% to as high as 1.7 wt.-% (from around 160 μm and 2.30×10$^5$ cells·cm$^{-3}$ to around 153 μm and 3.40×105 cells·cm$^{-3}$), showing the heterogeneous cell nucleation effect promoted by the talc particles. Although 0.5 wt.-% Comparative Talc A foams (Comparative Example 1) displayed cell densities that were apparently lower than that of the unfilled polypropylene foams (2.30× 10$^5$ cells·cm$^{-3}$ compared to the 2.67×10$^5$ cells·cm$^{-3}$ of the unfilled polypropylene foams), this small difference was attained to their higher relative density, which affected the determination of $N_f$ (see equation). As a matter of fact, polypropylene+0.5 wt.-% Comparative Talc A foams (Comparative Example 1) still displayed considerable lower cell size values (around 160 μm, when compared to the 268 μm of the unfilled polypropylene foams), comparable to the other polypropylene-talc foamed composites. Nevertheless, the main differences regarding cellular structure are still observed with incorporating talc to polypropylene (cell size reduction, increased cell density and improved cell isotropy when compared to the unfilled polypropylene foam), mainly for a talc concentration of 1 wt.-% or higher.

Figure 13:
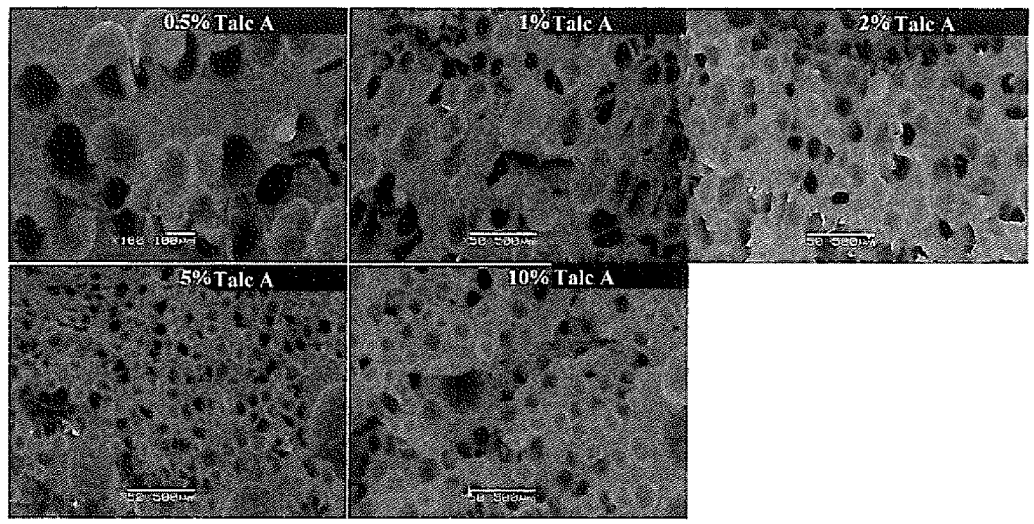
Figure 14:
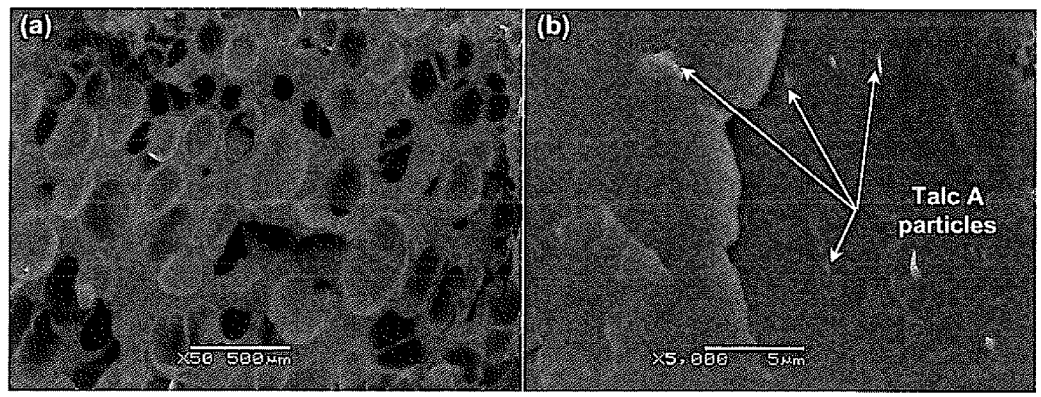
Figure 15:
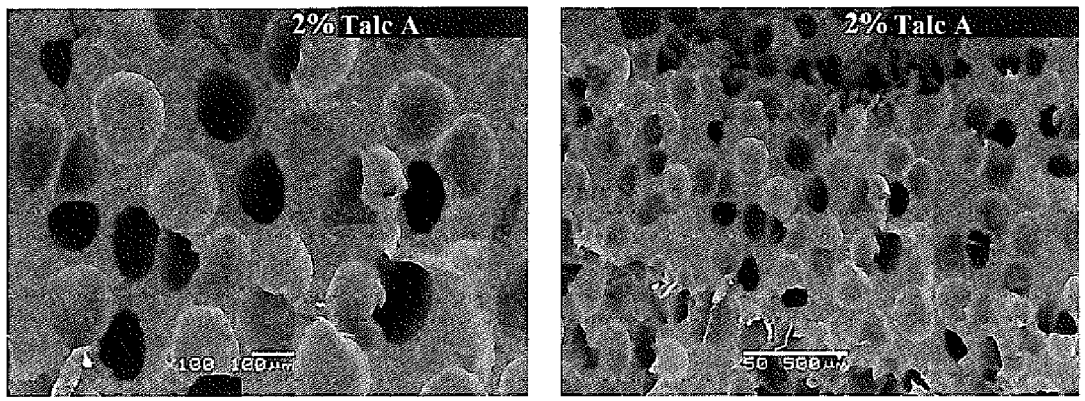
Figure 16:
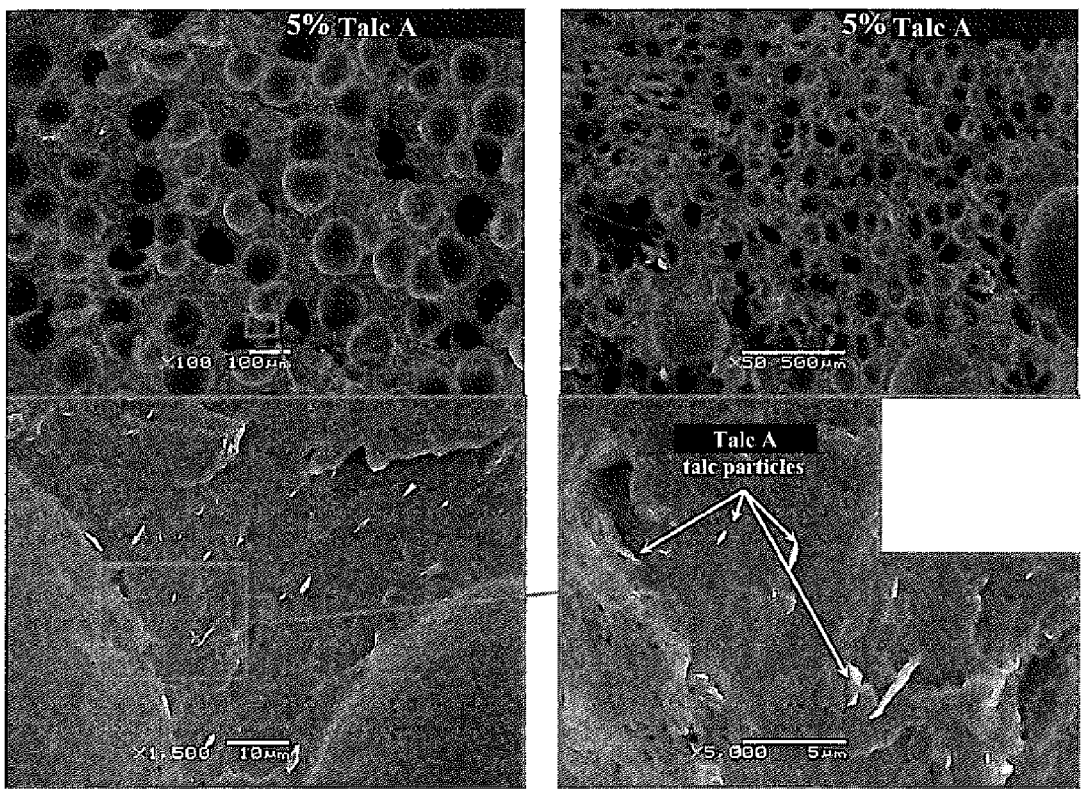
Figure 17:
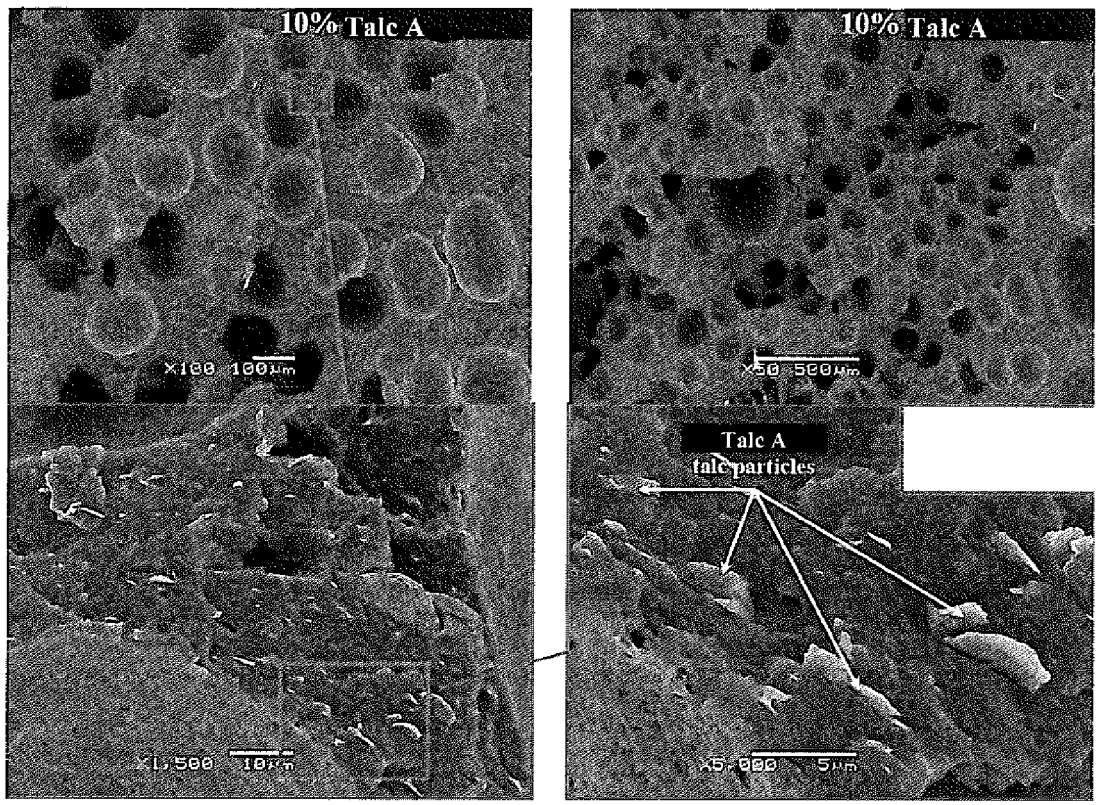
Figure 18:
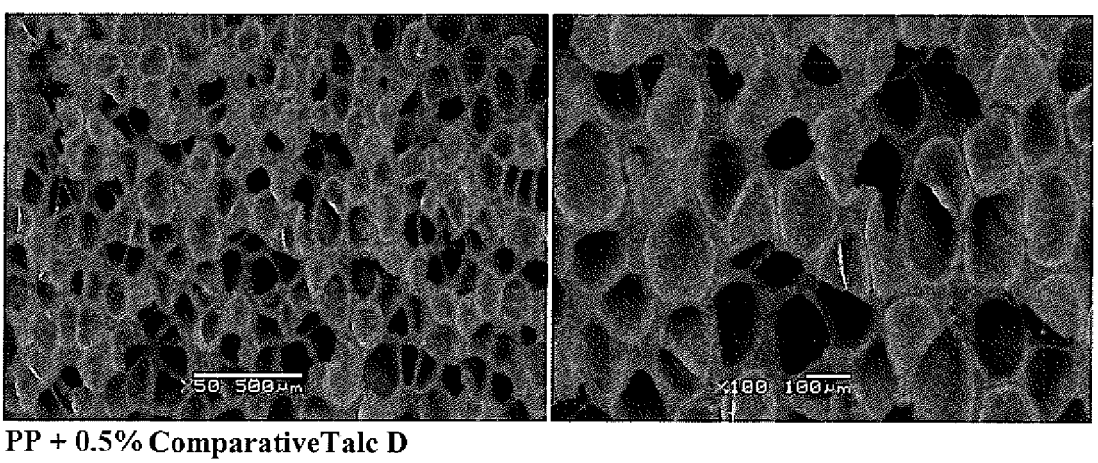

FIGS. 12 and 14 to 17, as well as in comparative fashion FIG. 13 show increasingly finer cells (smaller cell sizes) and more isotropic-like cellular structures (aspect ratios closer to 1) with increasing microcrystalline talc concentration, up until a Talc A amount of 10 wt.-% (Example 5) is obtained. Saturation of the system in terms of the cell nucleation efficiency is obtained when the talc concentration reaches 10 wt.-%.

Only slight differences were found between Comparative Talc A and Comparative Talc B foams. Although the higher cell size reduction was apparently observed for the Comparative Talc A-1.7 foam (1.7 wt % Comparative Talc A; (Comparative Example 4), when compared for instance with the Comparative Talc B counterpart (Comparative Example 8), it has to be taken into account that the St-1.7 foam presented a lower talc content when compared to Comparative Talc A-1.7 (1 wt.-% Comparative Talc B in Comparative Example 8, compared to 1.7 wt % Comparative Talc A in Comparative Example 4). When comparing more similar talc contents, almost identical results were obtained in terms of cell size for both types of talc, though the incorporation of the finer talc (Comparative Talc B) led to foams with a higher cell density (3.15×10$^5$ cells·cm$^{-3}$, compared to 3.00× 10$^5$ cells·cm$^{-3}$ for 1% Comparative Talc Afoam; Comparative Example 2), mainly related to their lower relative density (higher expansion).

Effect of talc morphology: Although the addition of Talc A (Examples 1 to 5) led to foams with higher cell sizes when compared to the ones with Comparative Talc C (Comparative Examples 1 to 4; around 187 μm compared to 156 μm), these foams according to Example 4 displayed cell densities that were more than 2 times higher than that of polypropylene+Comparative Talc C foams, which was related not only to the lower relative density, i.e. higher expansion, of polypropylene+Talc A foams, but to the microcrystalline morphology of the talc particles. The highest cell nucleation was obtained with 5 wt.-% Talc A (microcrystalline talc). At 10 wt.-% Talc A, lower cell nucleation is obtained due to a considerable aggregation of talc particles in the polypropylene matrix.

In particular, nucleants should have a combination of the most uniform possible size, shape and surface properties. Since Talc A has a microcrystalline morphology when compared to Comparative Talc C and hence a much higher and uniform surface area (11.0 m$^2$/g compared to the 6.5 m$^2$/g of Comparative Talc C), direct result of microcrystalline talc's smaller platelets when compared to the much larger individual platelets of the highly lamellar talc, a higher cell nucleation is obtained. Without wishing to be bound by theory, it is believed that this better cell nucleation is attributed to the fact that the rough and higher surface area of microcrystalline talc tends to entrap more air creating more nuclei and finer bubbles.

The analysis indicates that although the addition of both 1 wt.-% talc Comparative Talc D (Comparative Example 12) and 1 wt.-% Talc B (Example 7) led to foams with quite similar average cell sizes (around 190 μm), the second type of (microcrystalline) talc resulted in foams with considerably higher cell densities (2.68×10$^5$ cells·cm$^{-3}$ in the case of polypropylene+1 wt.-% Talc B foam (Example 7) and 1.21×10$^5$ cells·cm$^{-3}$ in the case of polypropylene+1 wt.-%

Figure 19:
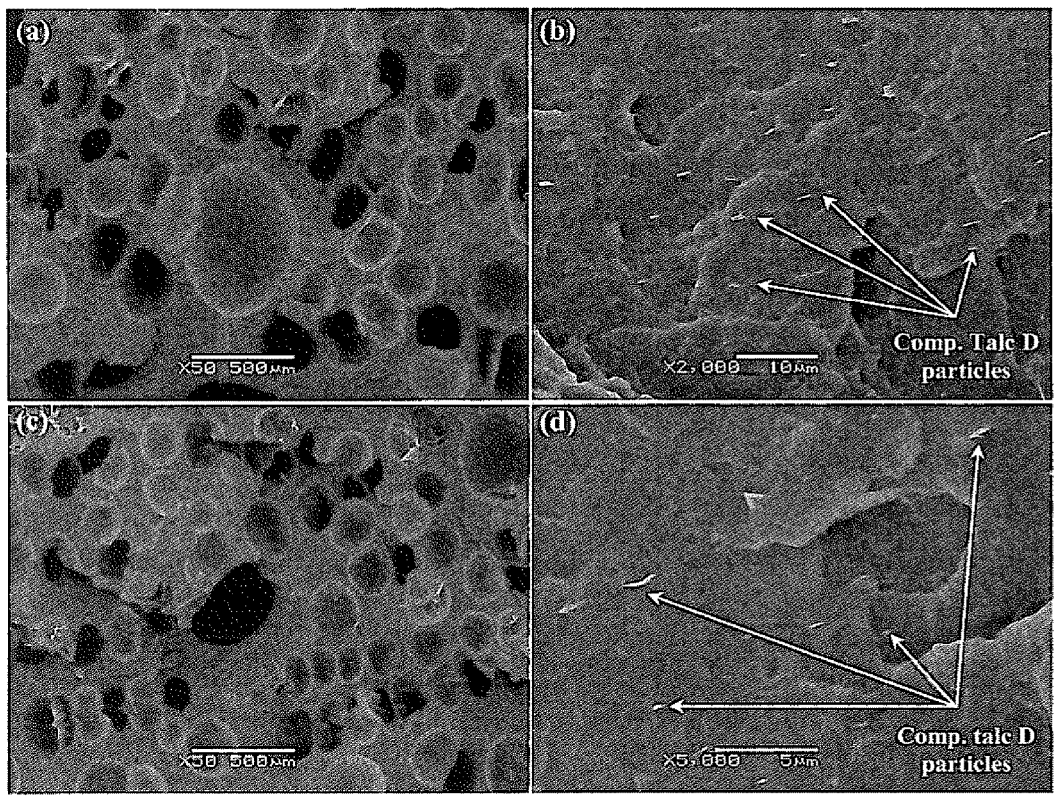
Figure 20:
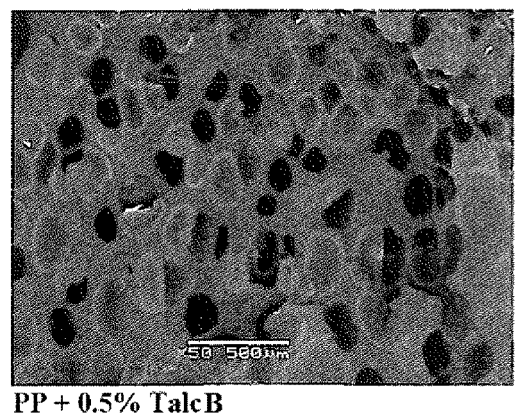
Figure 21:
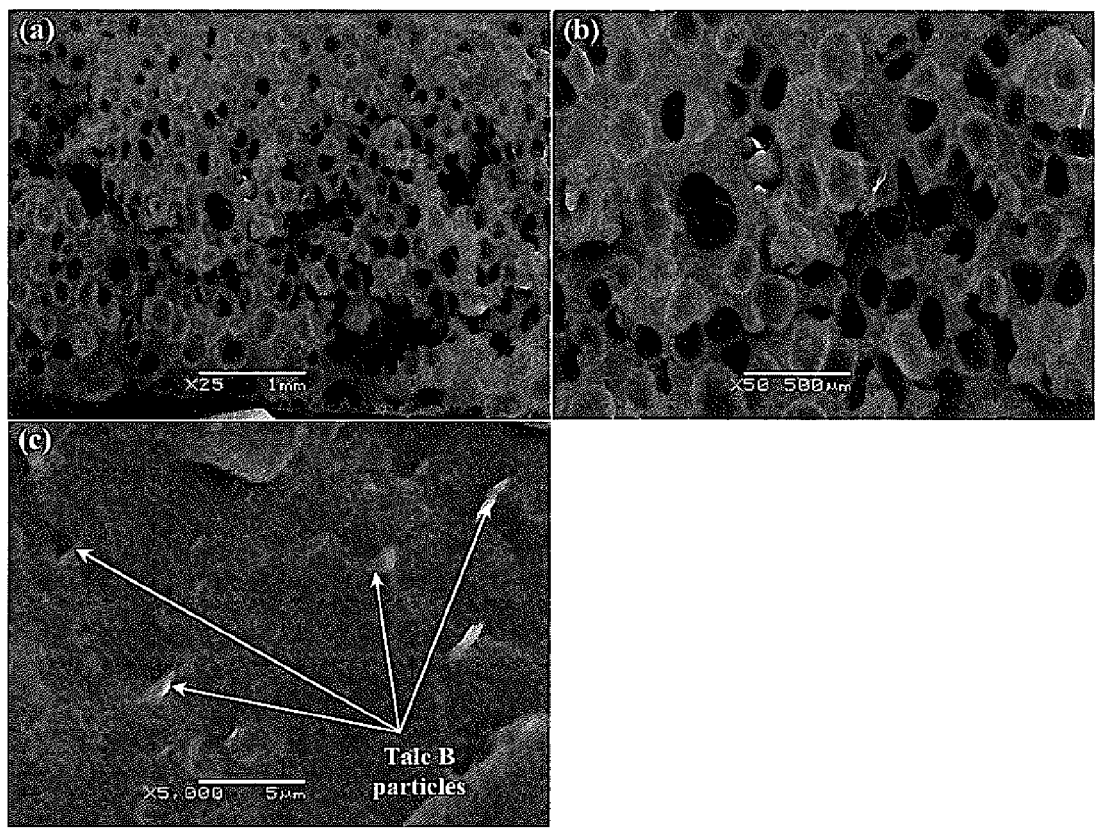

Comparative Talc D—see comparative shown in FIGS. 19 and 21), which was related to the microcrystalline talc morphology of Talc B.

The foams produced according to the two-step extrusion-mixing and foaming process were analysed by DMTA characterisation as described above. The results and extrapolated n values are shown in Table 11:

TABLE 11

DMTA-characterisation of the polypropylene-talc foams produced according to the two-step extrusion-mixing and foaming process:

| Example | Solid/foam | E' at 30° C. (MPa) | E'$_{spec}$ at 30° C. (MPa · cm$^3$ · g$^{-1}$) | n |
|---|---|---|---|---|
| 2 | Solid | 1701.0 | 1869.2 | 1.0 |
|  | Foam | 1154.0 | 1862.9 |  |
| 3 | Solid | 1778.0 | 1924.2 | 1.2 |
|  | Foam | 972.8 | 1711.2 |  |
| 4 | Solid | 168.0 | 2073.8 | 1.3 |
|  | Foam | 886.4 | 1735.1 |  |
| 5 | Solid | 2117.0 | 2160.2 | 1.4 |
|  | Foam | 1114.0 | 1686.1 |  |
| 7 | Solid | 1693.0 | 1846.2 | 1.1 |
|  | Foam | 963.4 | 1760.9 |  |
| Comp. 10 | Solid | 1807.0 | 1970.6 | 1.0 |
|  | Foam | 1272.0 | 1954.4 |  |
| Comp. 11 | Solid | 1624.0 | 1829.0 | 1.4 |
|  | Foam | 647.9 | 1385.5 |  |
| Comp. 12 | Solid | 1785.0 | 1950.8 | 1.4 |
|  | Foam | 789.4 | 1556.8 |  |

The parameter n is an indicator of the deterioration of the properties of the foams when compared to the unfoamed equivalent, and taking into account the reduced density of the foams. A lower n-value indicates a better performance of the corresponding foam. The results displayed in Table 11 indicate that the foamed materials of the Examples according to the present invention have improved or equivalent performances, in view to the comparative examples, where lamellar and highly lamellar talcs were employed. Even in the case of Example 5, in which the high loading of microcrystalline talc lead to aggregation of the particles, the performance of the talc-loaded polypropylene foam corresponds to that of the comparative materials.

Figure 22:
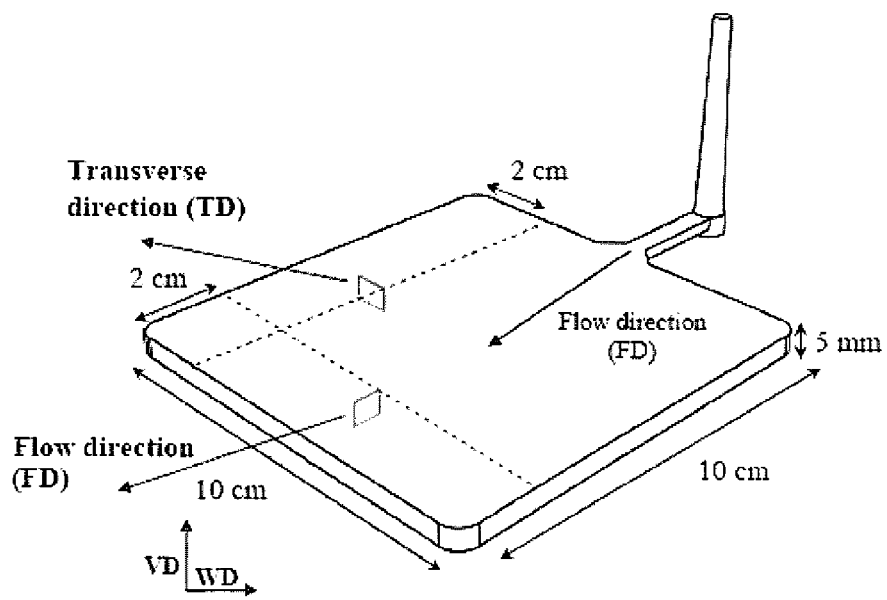
FIG. 22 shows an illustration of the flow direction (FD) and transverse direction (TD) measurements of the cellular structure of the foams produced according to the single-step injection-moulding foaming process.
Figure 23:
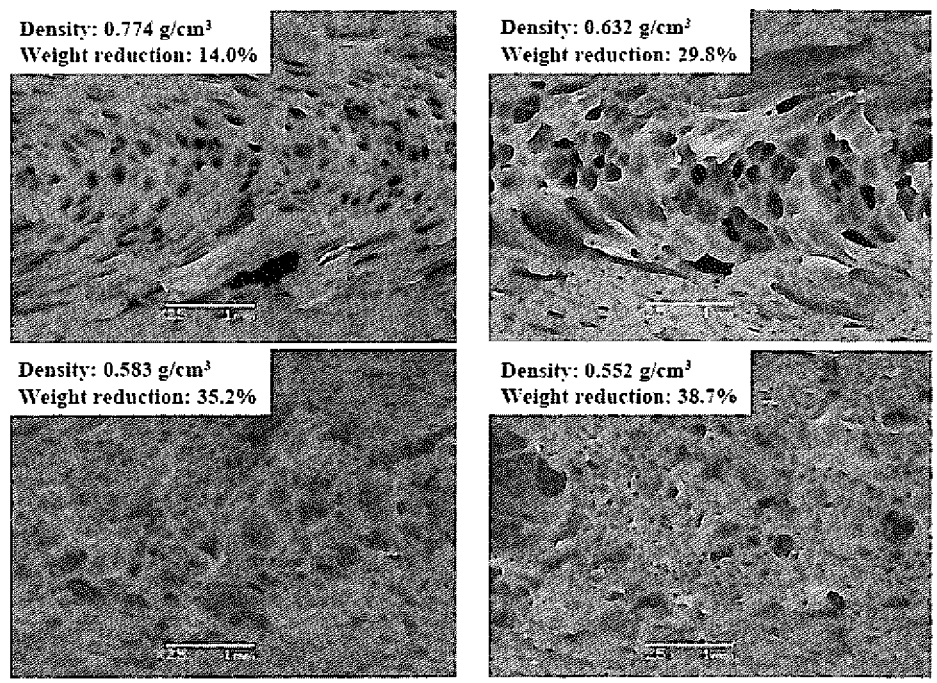
FIGS. 23 to 40 show SEM micrographs of the foams according to Examples 8 to 19 and comparative Examples 13 to 16 at various scales.
Figure 24:
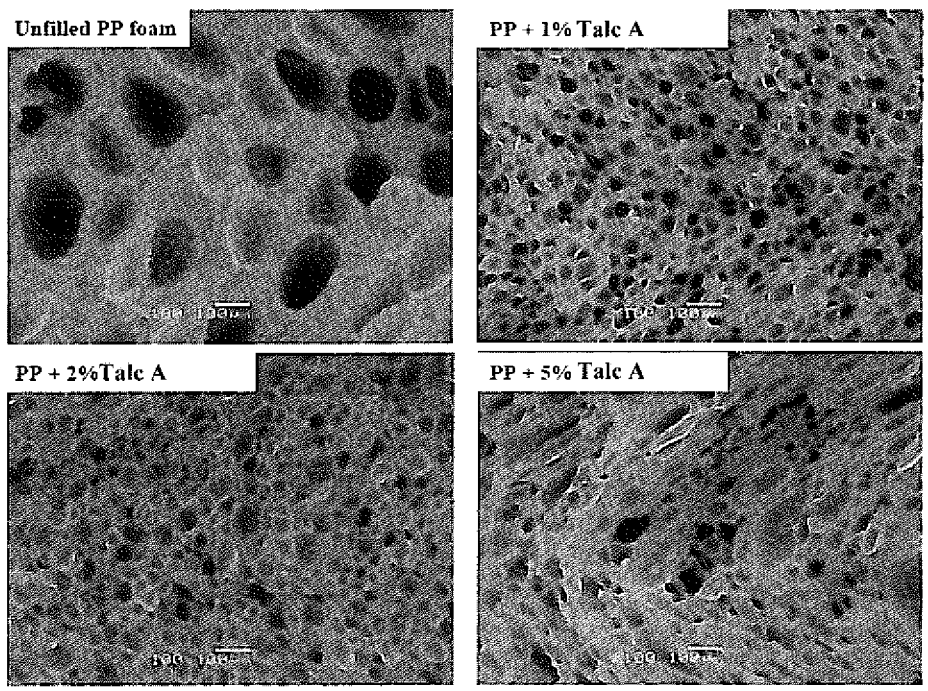
Figure 25:
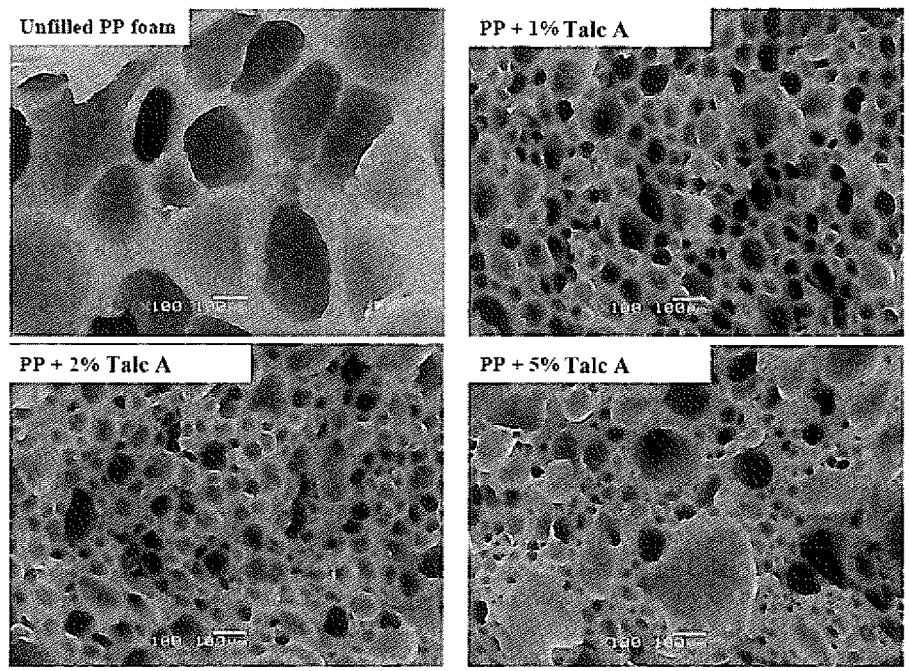
Figure 26:
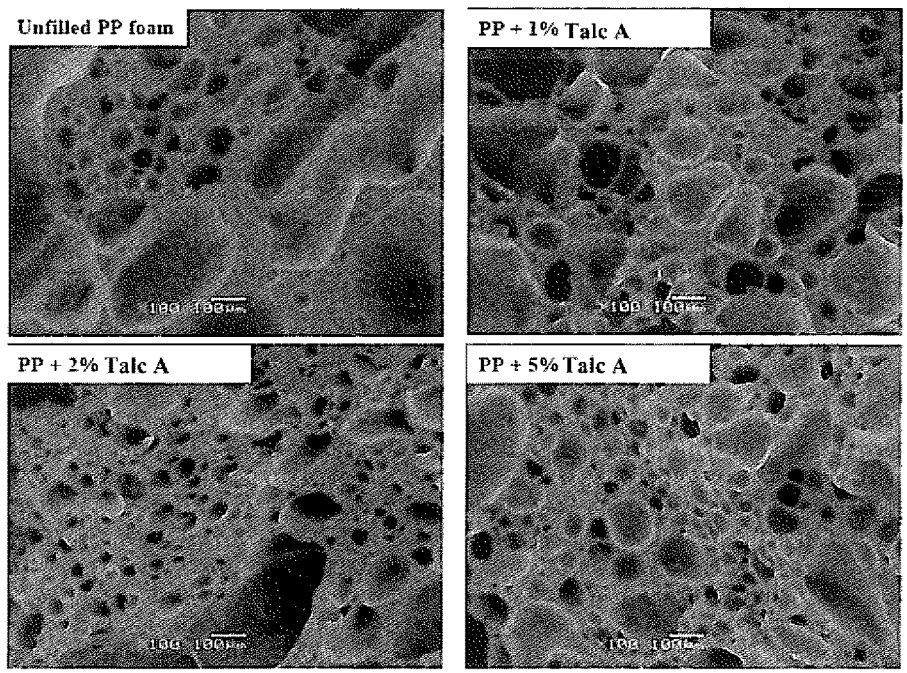
Figure 27:
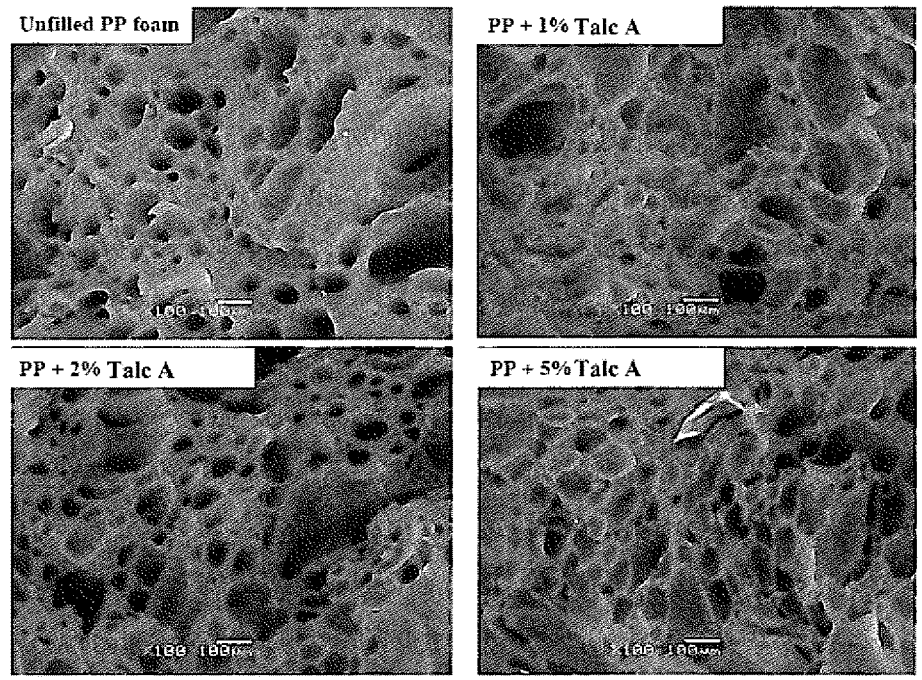
Figure 28:
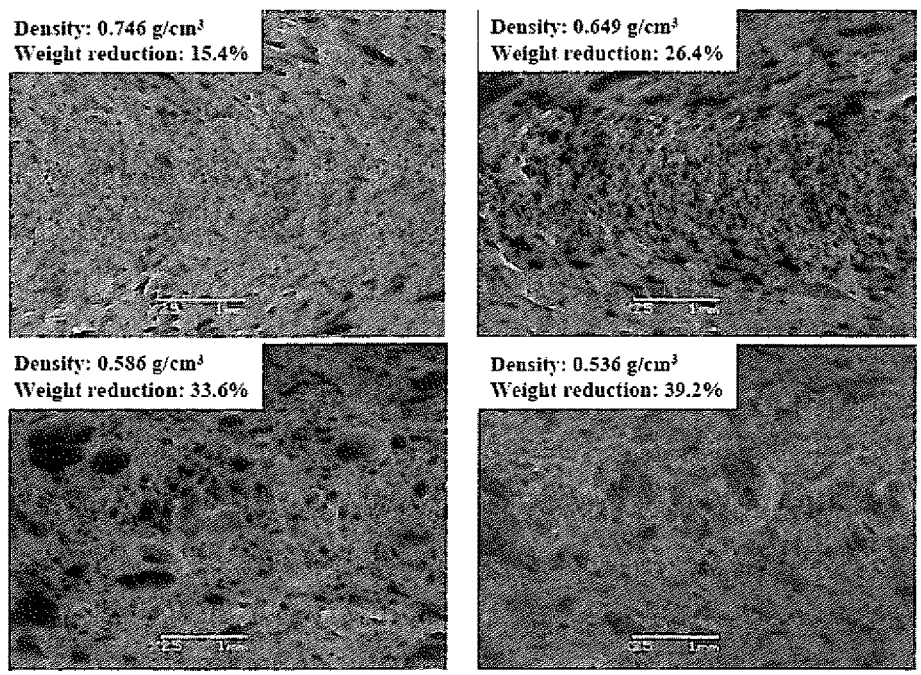
Figure 29:
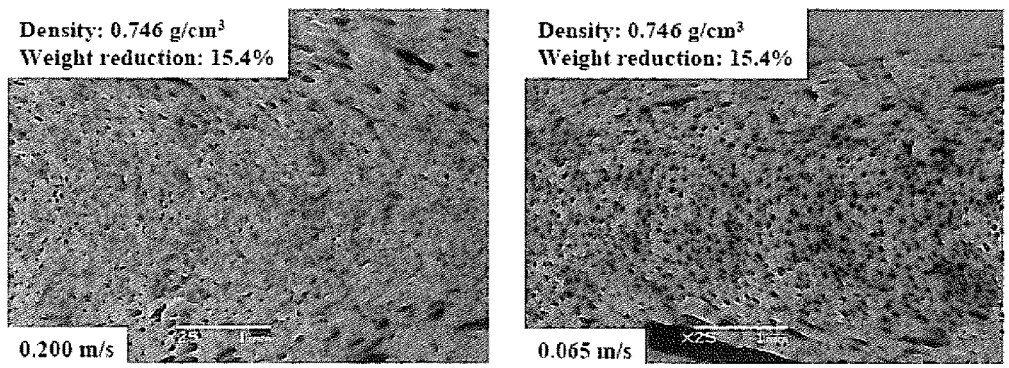
Figure 30:
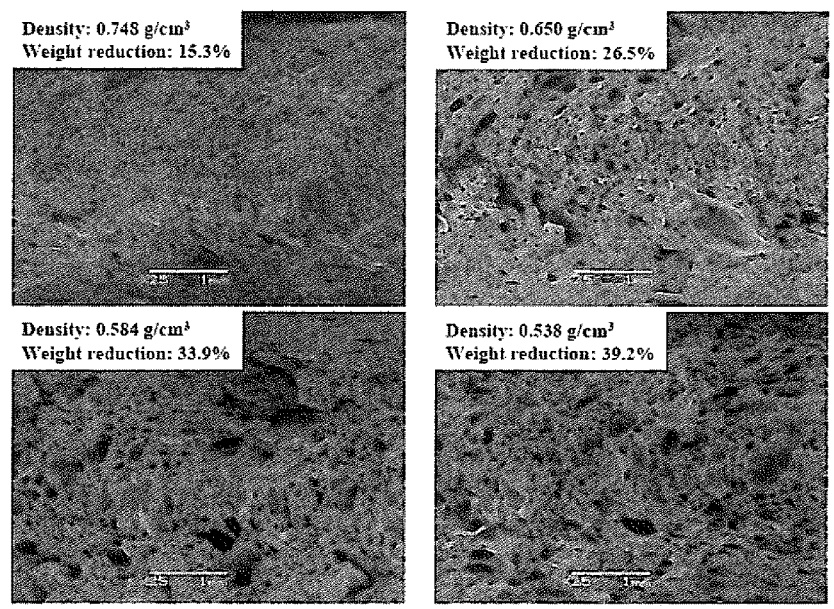
Figure 31:
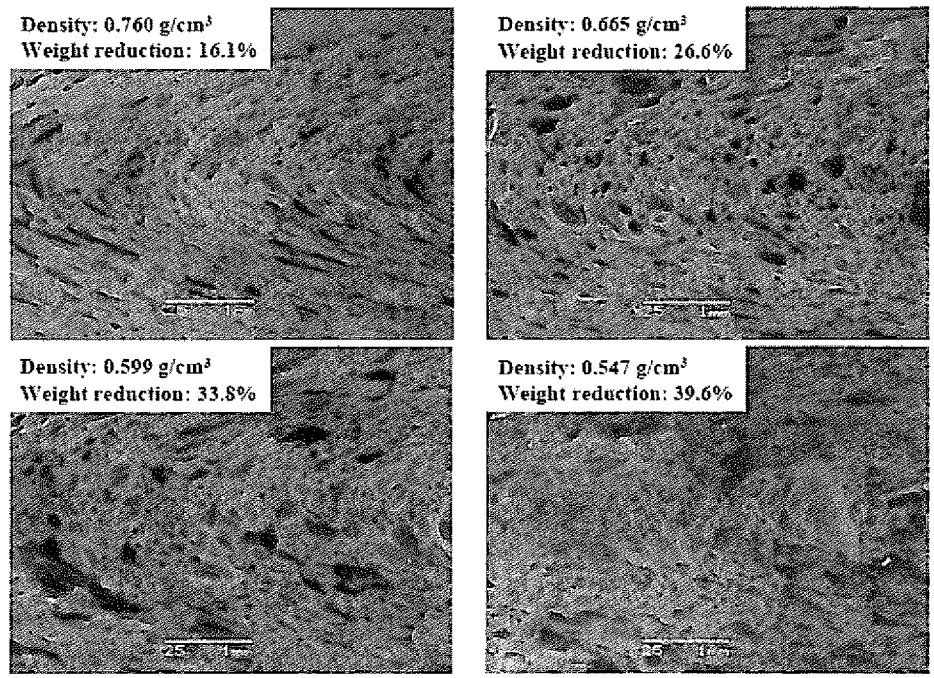
Figure 32:
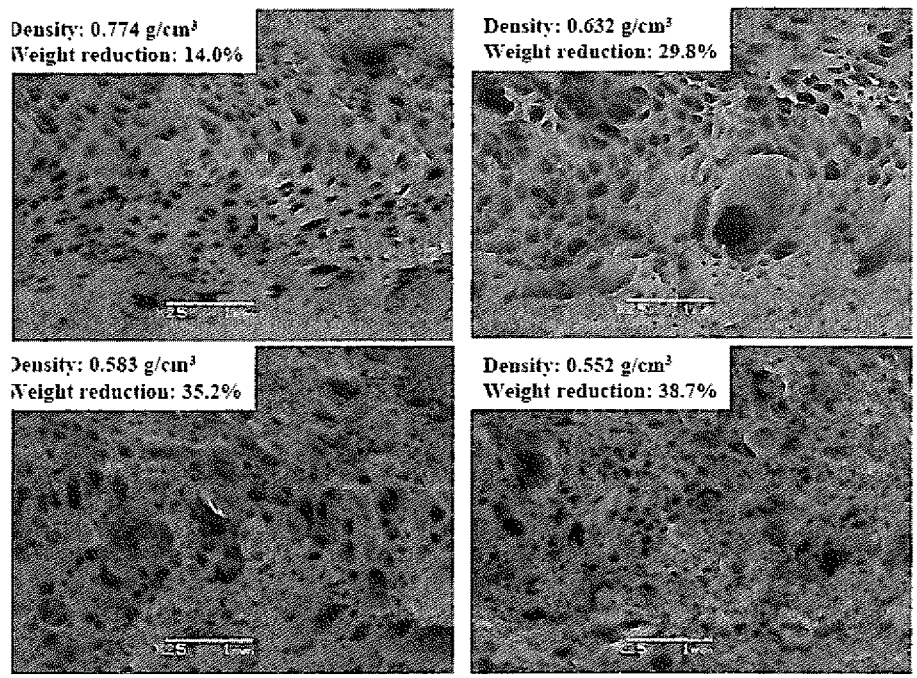

The cellular structures of the various foams produced according to the single-step injection-moulding Mucell® foaming process were measured. Since the properties of the cellular structures varied in the square plates, depending on whether the measurements were taken in the flow direction (FD) and the transverse direction (TD), both measurements are displayed in Tables 12 and 13. FIG. 22 illustrates the zones considered in the transverse direction (TD) and the flow direction (FD).

Example 8* represents a material that has identical components and proportions as in Example 8, but wherein the injection speed in the single-step injection-moulding foaming process was reduced from the standard 0.200 m·s$^{-1}$ to 0.065 m·s$^{-1}$.

TABLE 12

Cellular structures in the flow direction (FD) of polypropylene-talc foams produced according to the single-step injection-moulding foaming process:

| Example | Relative density | $\varphi_{FD}$ (μm) | $\Phi_{WD}$ (μm) | N$_f$ (cells · cm$^{-3}$) | FIG. |
|---|---|---|---|---|---|
| Comp. 13 | 0.86 | 107.1 | 154.8 | 1.38 × 10$^5$ | 23, 24 |
| Comp. 14 | 0.75 | 208.7 | 242.4 | 8.73 × 10$^4$ | 23, 25 |
| Comp. 15 | 0.67 | 121.3 | 113.1 | 8.43 × 10$^5$ | 23, 26 |

TABLE 12-continued

Cellular structures in the flow direction (FD) of polypropylene-talc foams produced according to the single-step injection-moulding foaming process:

| Example | Relative density | $\varphi_{FD}$ (μm) | $\Phi_{WD}$ (μm) | N$_f$ (cells · cm$^{-3}$) | FIG. |
|---|---|---|---|---|---|
| Comp. 16 | 0.62 | 73.9 | 94.5 | 2.08 × 10$^6$ | 23, 27 |
| 8 | 0.85 | 39.3 | 37.2 | 1.25 × 10$^7$ | 24, 28, 29 |
| 8* | 0.85 | 65.4 | 61.0 | 2.10 × 10$^6$ | 29 |
| 9 | 0.74 | 61.2 | 56.7 | 5.28 × 10$^6$ | 25, 28 |
| 10 | 0.66 | 88.5 | 86.0 | 1.63 × 10$^6$ | 26, 28 |
| 11 | 0.61 | 77.2 | 76.4 | 2.52 × 10$^6$ | 27, 28 |
| 12 | 0.85 | 44.9 | 41.3 | 9.06 × 10$^6$ | 24, 30 |
| 13 | 0.73 | 54.6 | 54.1 | 5.68 × 10$^6$ | 25, 30 |
| 14 | 0.66 | 46.9 | 59.0 | 4.68 × 10$^6$ | 26, 30 |
| 15 | 0.61 | 70.8 | 67.5 | 2.49 × 10$^6$ | 27, 30 |
| 16 | 0.84 | 47.5 | 56.1 | 3.94 × 10$^6$ | 24, 31 |
| 17 | 0.73 | 68.6 | 59.8 | 5.55 × 10$^6$ | 25, 31 |
| 18 | 0.66 | 72.4 | 58.8 | 4.83 × 10$^6$ | 26, 31 |
| 19 | 0.60 | 76.5 | 67.6 | 3.32 × 10$^6$ | 27, 31 |

TABLE 13

Cellular structures in the transversal direction (TD) of polypropylene-talc foam produced according to the single-step injection-moulding foaming process:

| Example | Relative density | $\varphi_{FD}$ (μm) | $\Phi_{WD}$ (μm) | N$_f$ (cells · cm$^{-3}$) | FIG. |
|---|---|---|---|---|---|
| Comp. 13 | 0.86 | 106.7 | 135.2 | 2.24 × 10$^5$ | 32, 33 |
| Comp. 14 | 0.75 | 167.0 | 169.2 | 1.63 × 10$^5$ | 32, 34 |
| Comp. 15 | 0.67 | 120.7 | 121.0 | 8.25 × 10$^5$ | 32, 35 |
| Comp. 16 | 0.62 | 65.1 | 92.3 | 2.12 × 10$^6$ | 32, 36 |
| 8 | 0.85 | 33.6 | 35.0 | 1.45 × 10$^7$ | 33, 37 |
| 8* | 0.85 | 76.1 | 73.7 | 1.48 × 10$^6$ | 38 |
| 9 | 0.74 | 62.7 | 66.7 | 4.92 × 10$^6$ | 34, 37 |
| 10 | 0.66 | 64.5 | 70.3 | 5.23 × 10$^6$ | 35, 37 |
| 11 | 0.61 | 71.2 | 91.3 | 1.35 × 10$^6$ | 36, 37 |
| 12 | 0.85 | 36.7 | 36.4 | 1.33 × 10$^7$ | 33, 39 |
| 13 | 0.73 | 62.3 | 58.6 | 4.82 × 10$^6$ | 34, 39 |
| 14 | 0.66 | 67.8 | 69.2 | 3.53 × 10$^6$ | 35, 39 |
| 15 | 0.61 | 65.7 | 88.1 | 2.59 × 10$^6$ | 36, 39 |
| 16 | 0.84 | 27.1 | 27.5 | 3.06 × 10$^7$ | 33, 40 |
| 17 | 0.73 | 71.1 | 72.8 | 5.90 × 10$^6$ | 34, 40 |
| 18 | 0.66 | 54.8 | 64.1 | 3.97 × 10$^6$ | 35, 40 |
| 19 | 0.60 | 69.4 | 79.9 | 4.02 × 10$^6$ | 36, 40 |

The cellular structures of the various foams produced according to the single step injection moulding foaming process are shown in FIGS. 23 to 40.

As can be seen, the incorporation of talc resulted in foams with lower average cell sizes. As is shown in Examples 8 and 8* of Tables 12 and 13, as well as FIGS. 29 and 38, a lower injection speed led to foams with higher cell sizes and lower cell concentration, both in the flow direction (FD) and the transversal direction (TD). Therefore, the injection speed was maintained at 0.200 m·s$^{-1}$ in all other Examples.

In the unfilled polypropylene foams 1 to 3 (Comparative Examples 13 to 15) the cell sizes φ in all directions remain above 110 μm and the cell number below 10$^6$ cells·cm$^{-3}$. The difference between the cell sizes in the flow direction (FD) and the transversal direction (TD) is relatively high, and the cell aspect ratios $$AR = \frac{\varphi_{VD}}{\varphi_{WD}} < 1.$$

On the other hand, the foams made form the polypropylene/Talc A composites have cell sizes φ in all directions remain below 80 µm, sometimes below 40 µm and the cell number concentrations above $10^6$ cells·cm$^{-3}$, in some cases even above $10^7$ cells·cm$^{-3}$. Furthermore, the difference between the cell sizes in the flow direction (FD) and the transversal direction (TD) is relatively lower, compared to the non-nucleated foams, and the cell aspect ratios are closer to 1, meaning that the foams are more isotropic. The influence of the flow direction on the foaming is lower and hence more dimensionally uniform ("symmetrical") foams can be obtained.

Among the nucleated polypropylene foams, the differences between the various talc concentrations were not significant. However, it can be seen that higher talc loadings lead to increased $N_f$-values for the cell concentrations. The addition of increasingly high amounts of microcrystalline talc had a higher effect in terms of cell size, especially for the more highly expanded foams, particularly in the transversal direction (TD). It is speculated that this may be due to a plasticization effect of the talc, which promotes higher differences of cell sizes in the flow direction.

Figure 33:
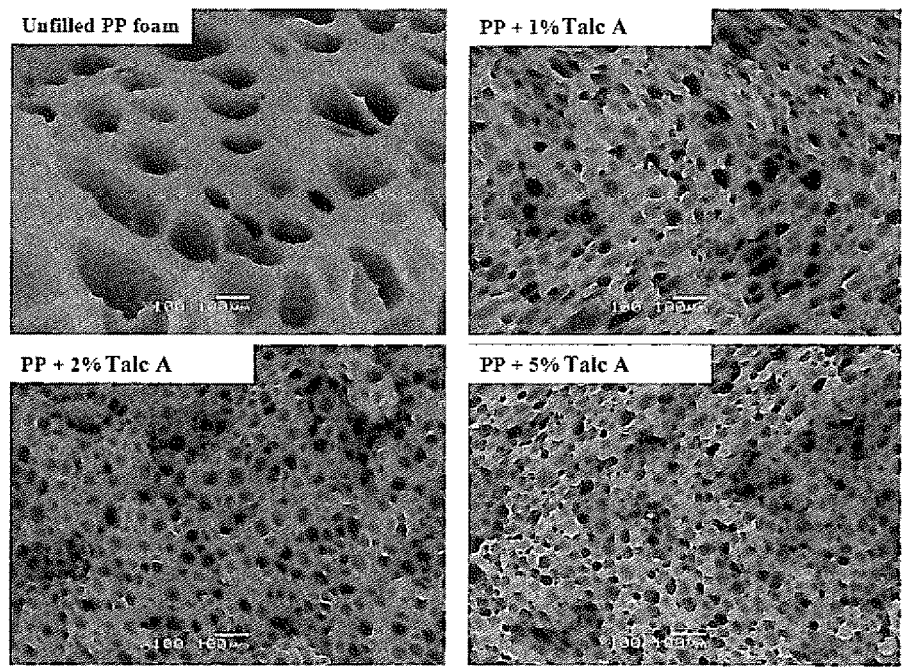
Figure 34:
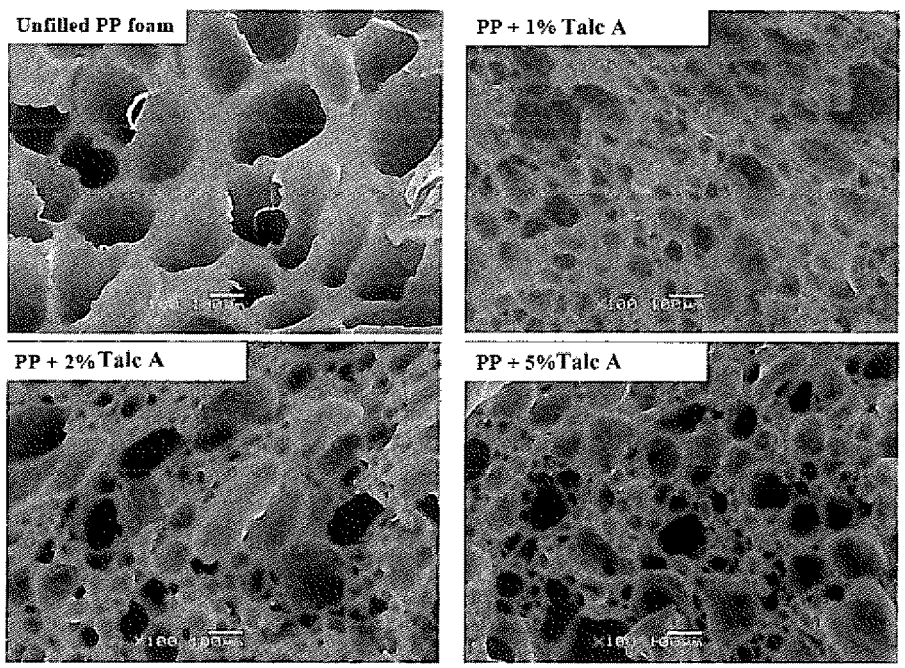
Figure 35:
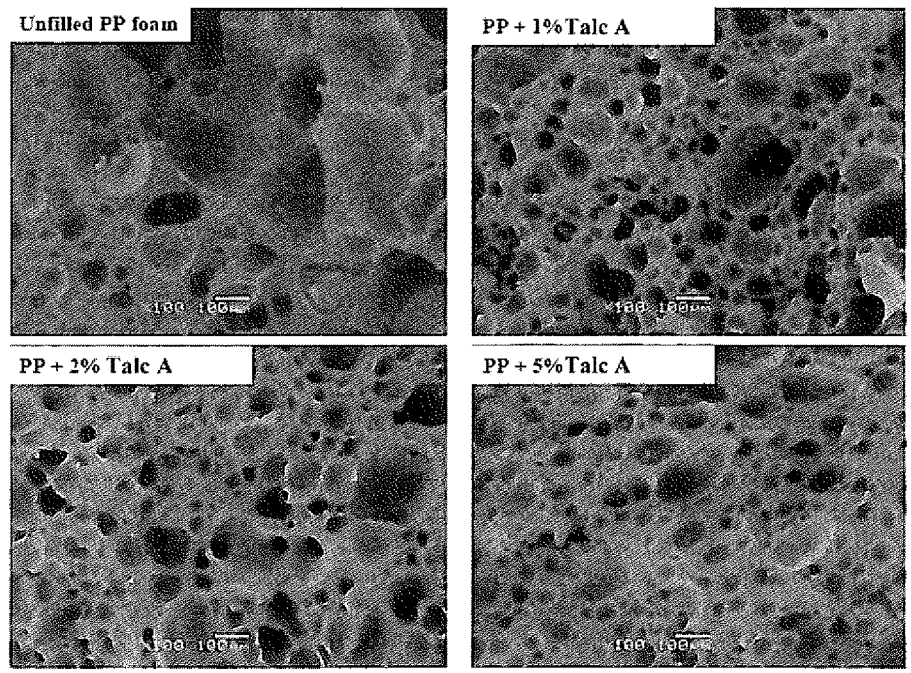
Figure 36:
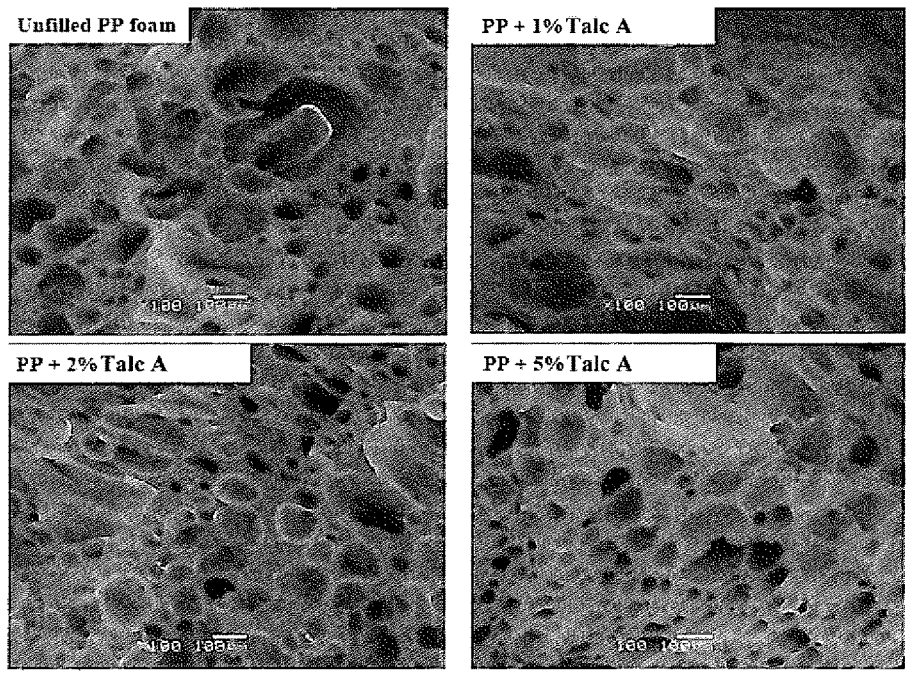
Figure 37:
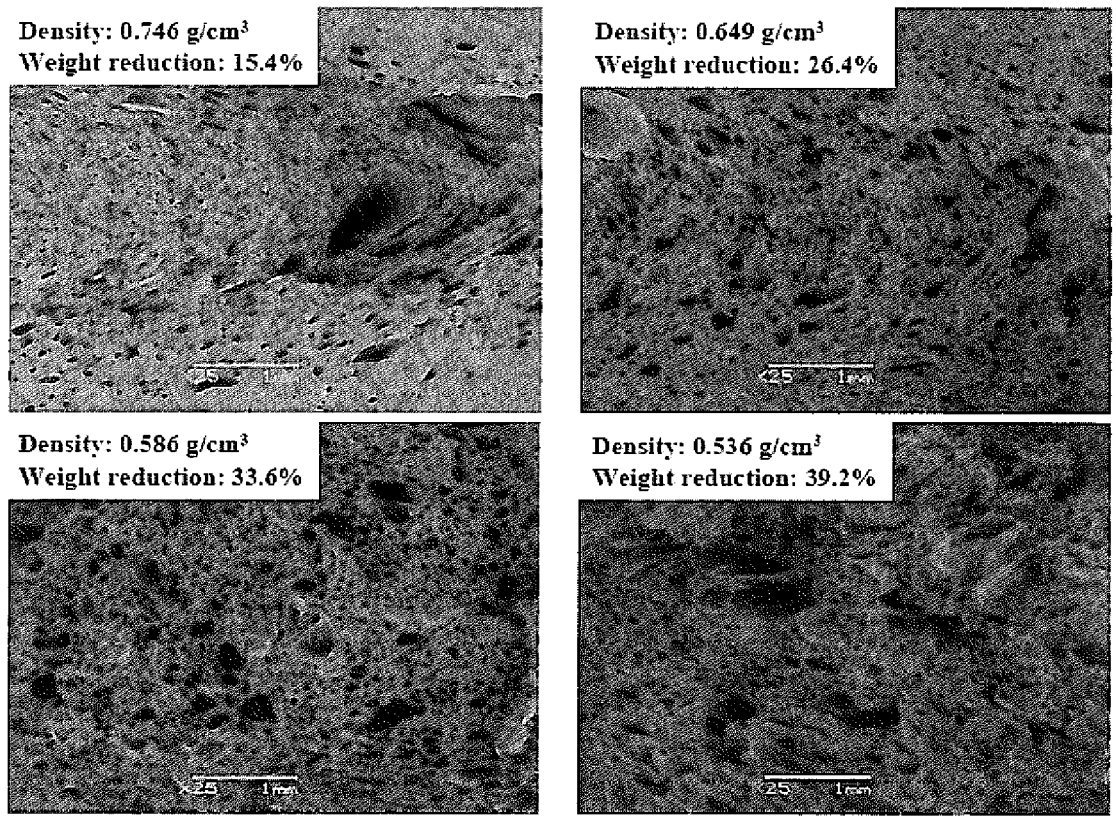
Figure 38:
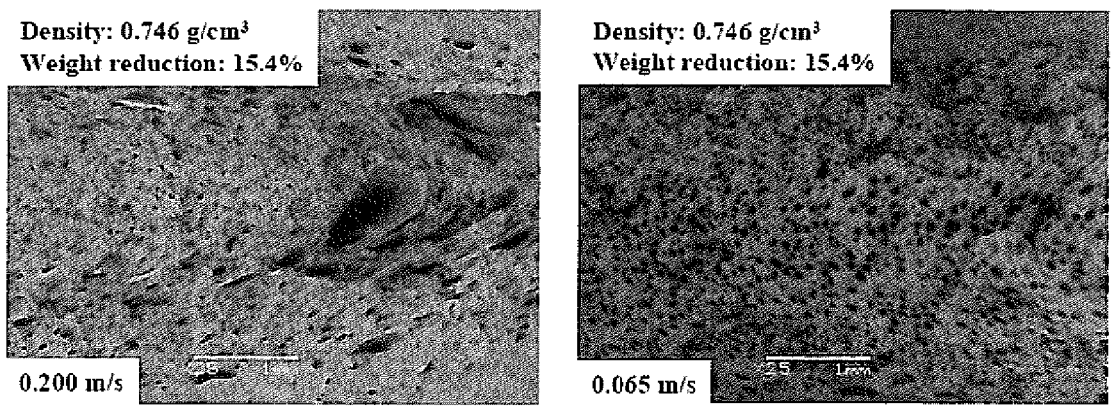
Figure 39:
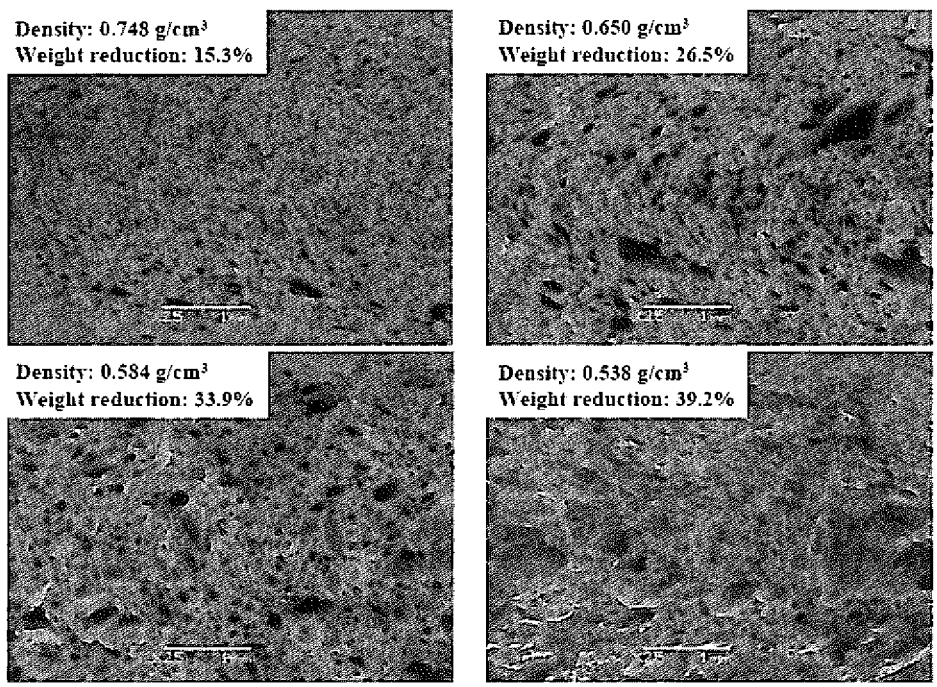
Figure 40:
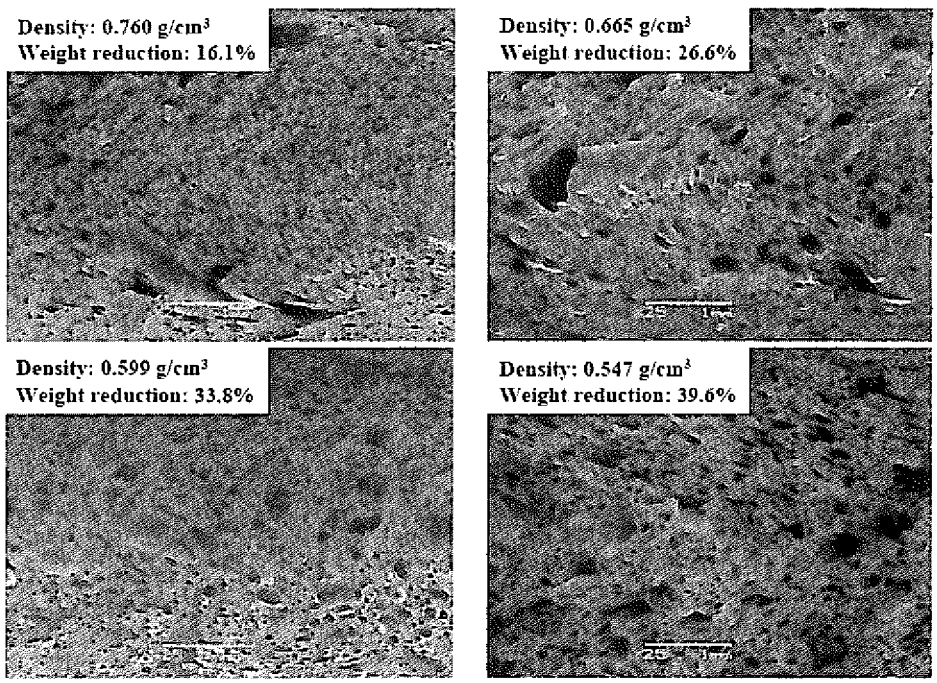
Figure 41:
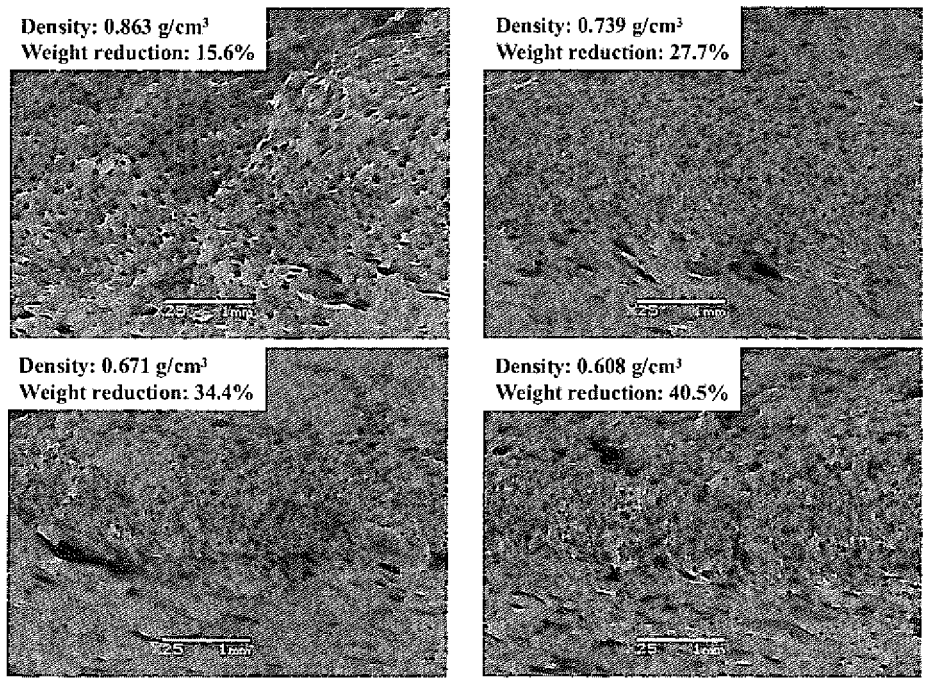
FIGS. 41 to 58c show SEM micrographs of the foams according to Examples 20 to 31 and comparative Examples 17 to 20 at various scales.
Figure 42:
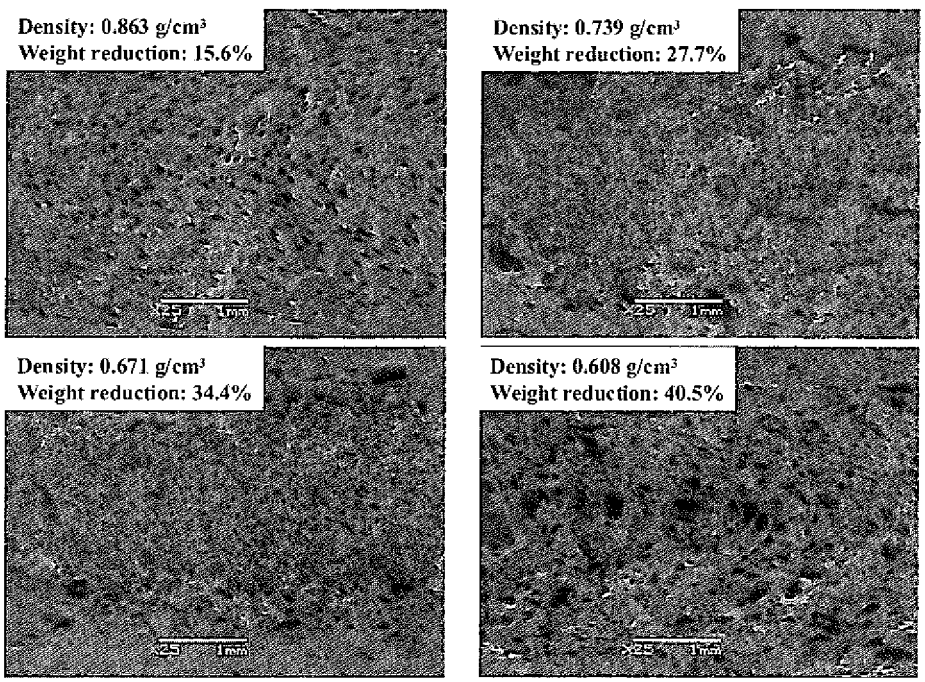
Figure 43:
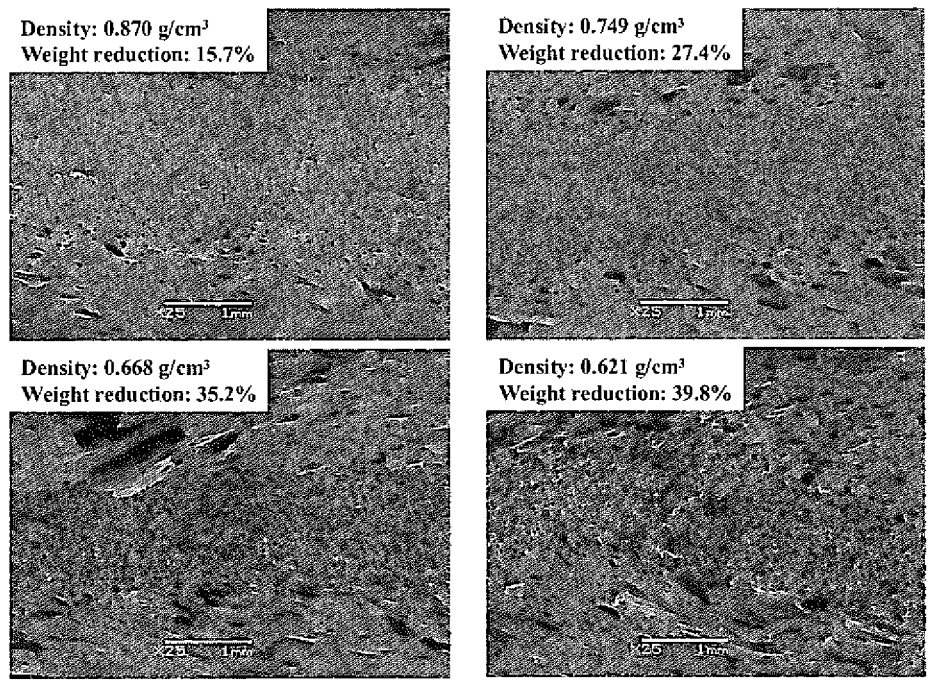
Figure 44:
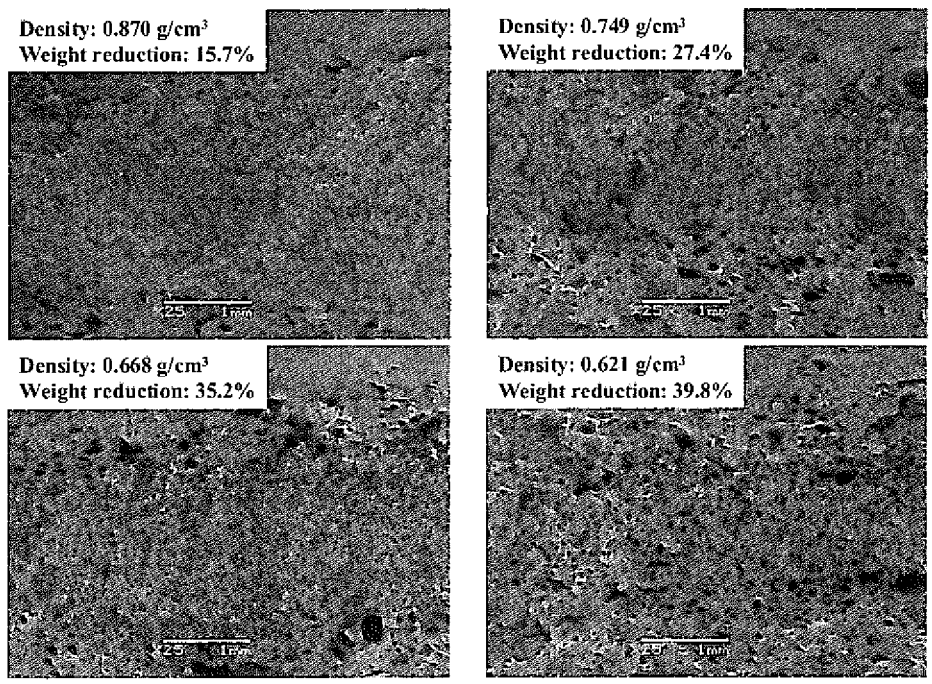
Figure 45:
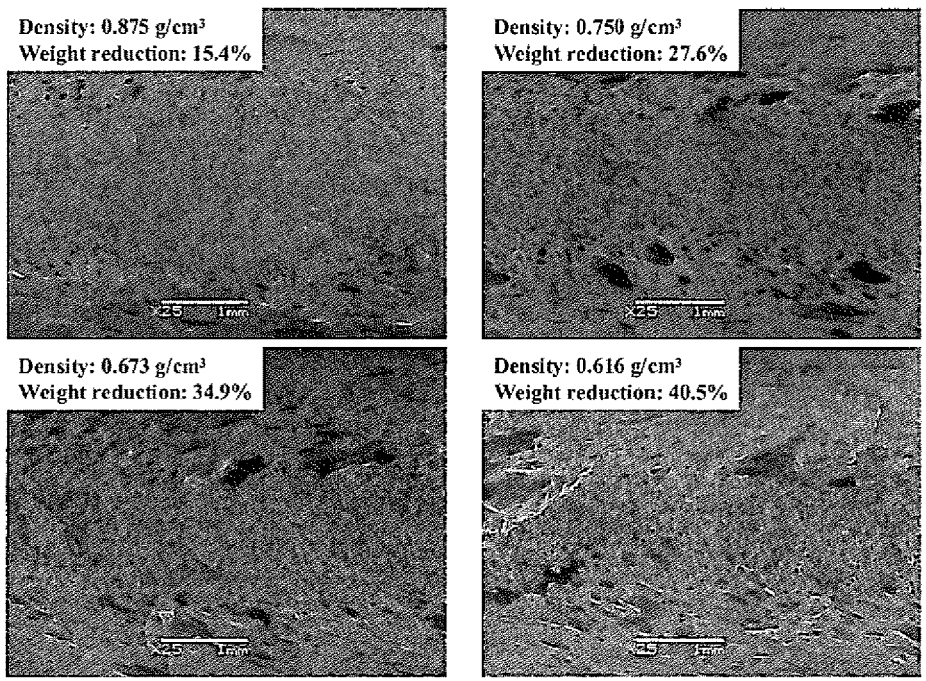
Figure 46:
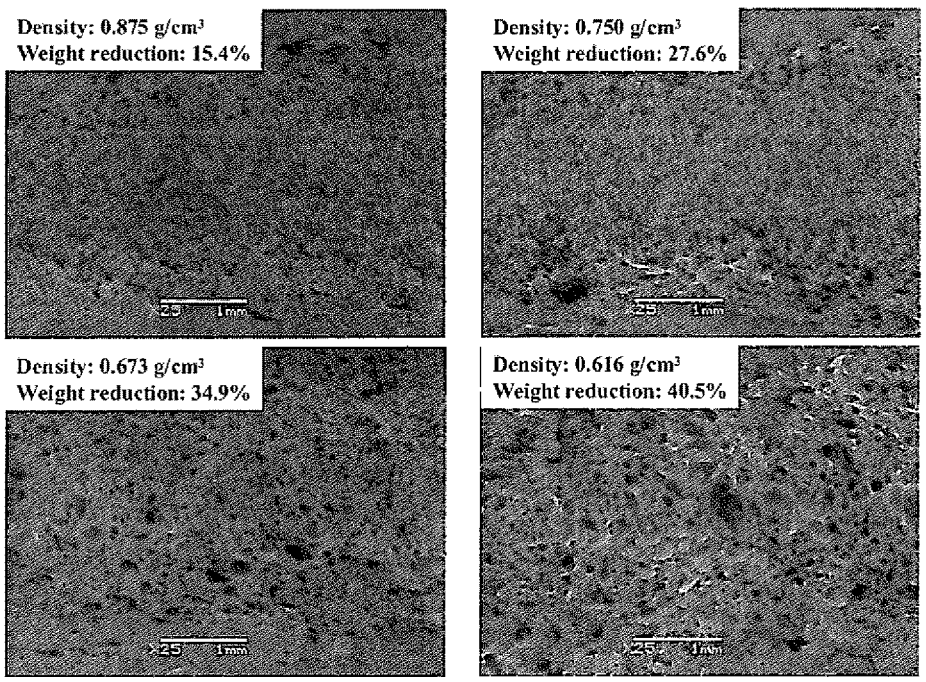
Figure 47:
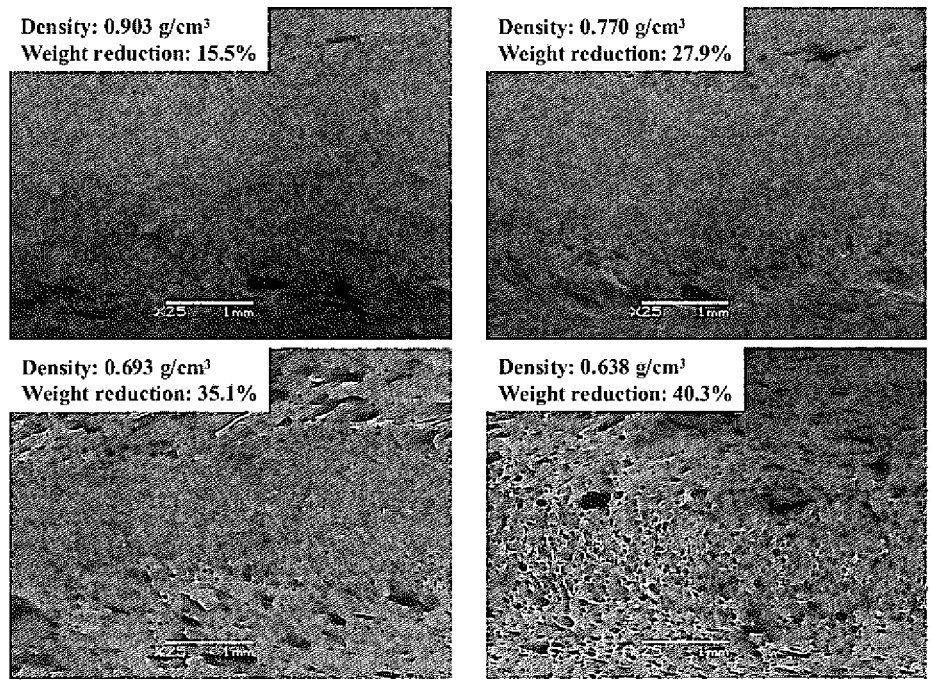
Figure 48:
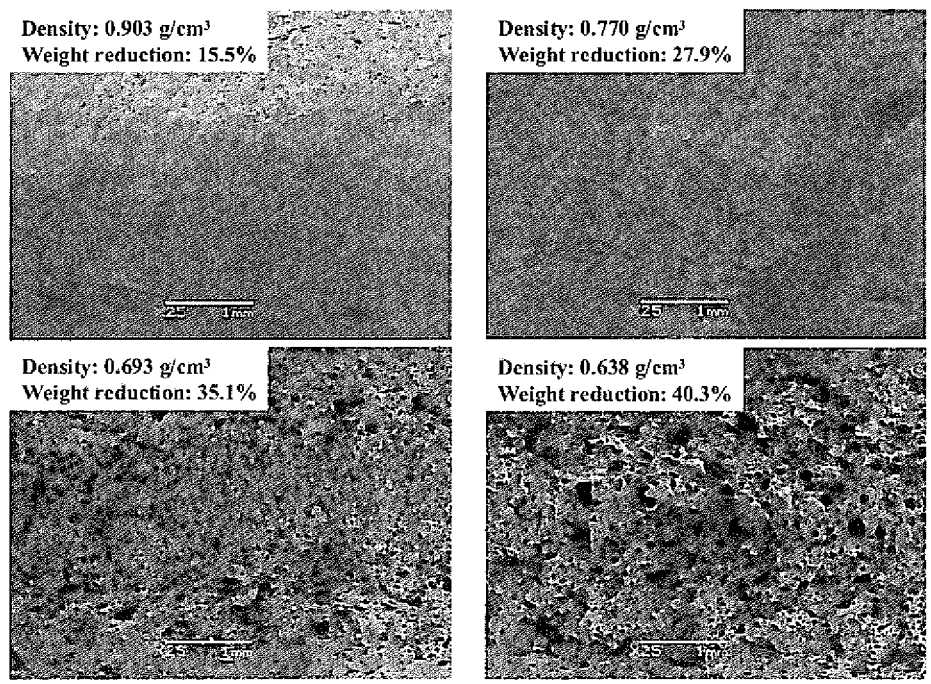
Figure 49A:
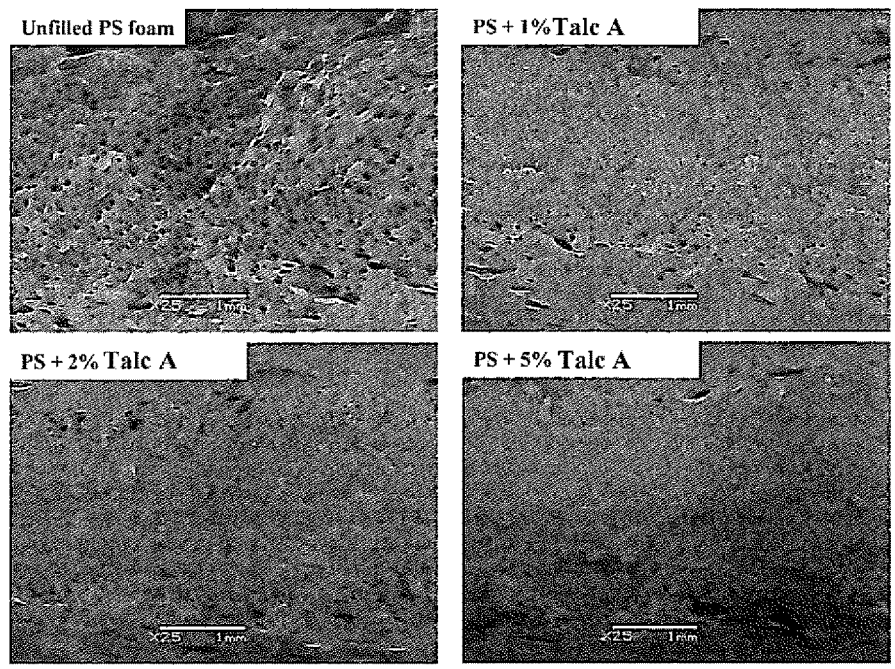
Figure 49B:
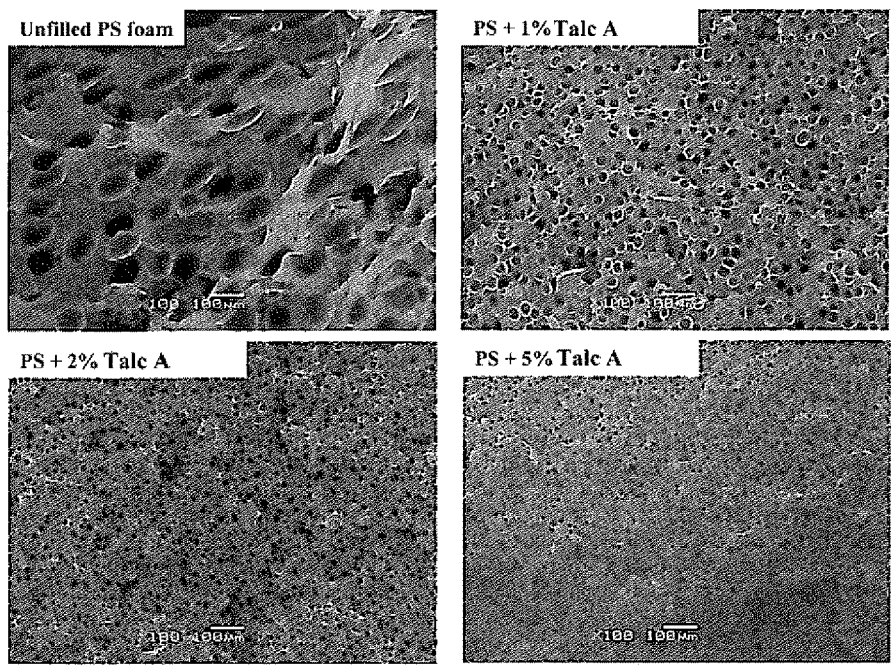
Figure 50A:
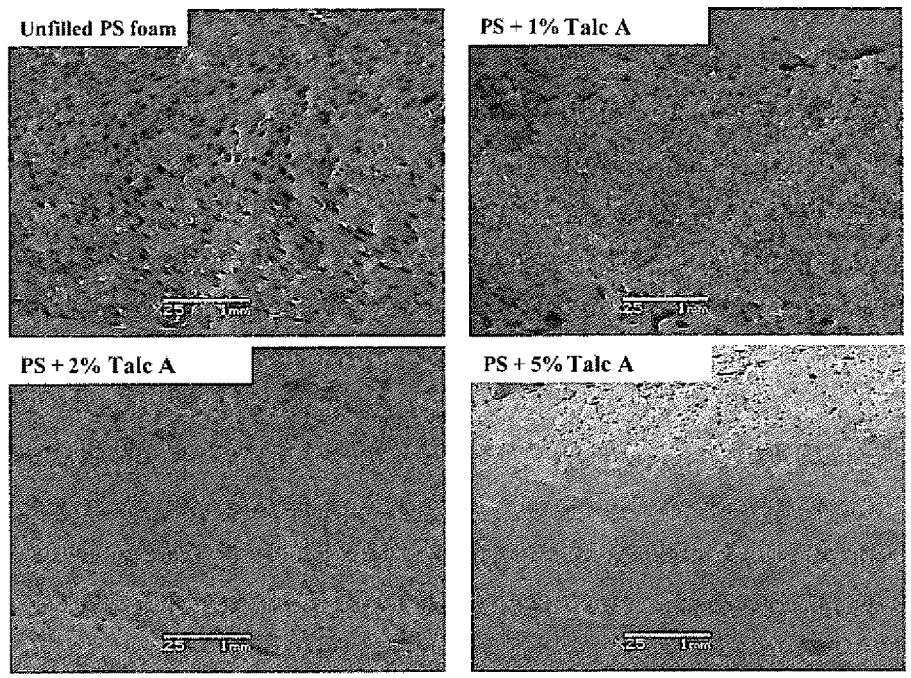
Figure 50B:
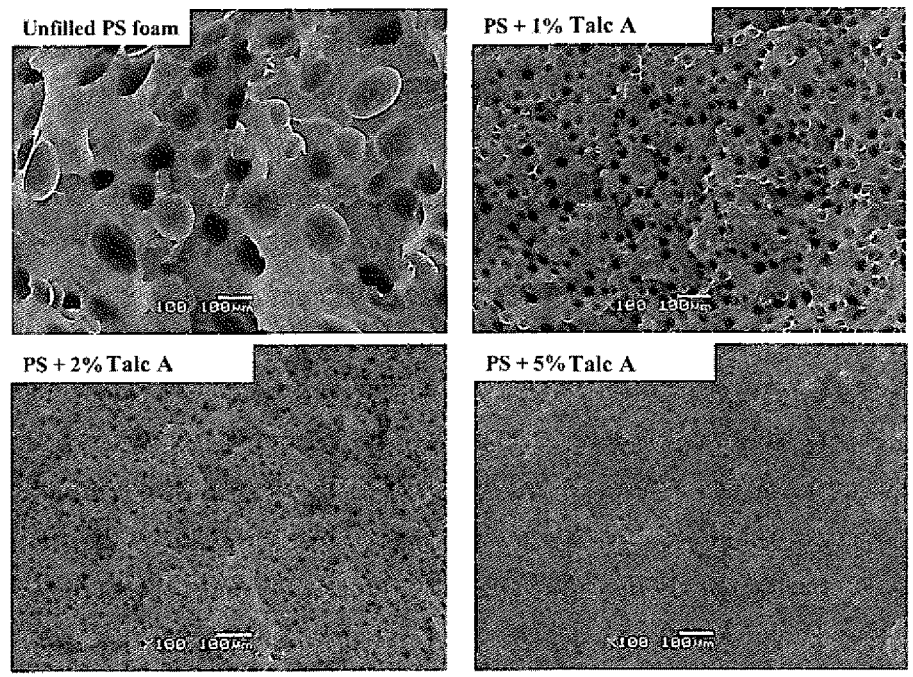
Figure 51A:
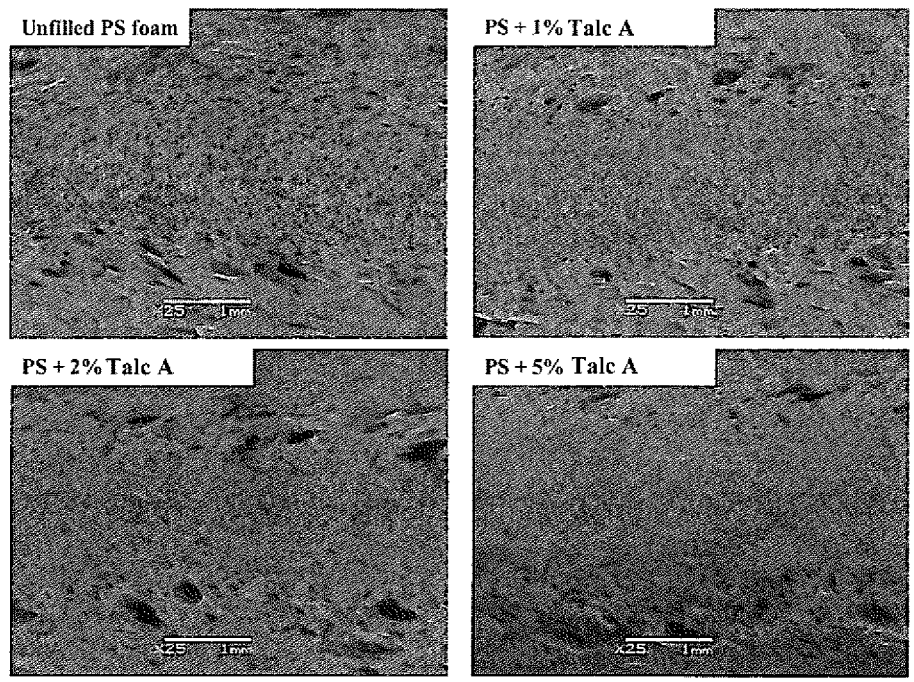
Figure 51B:
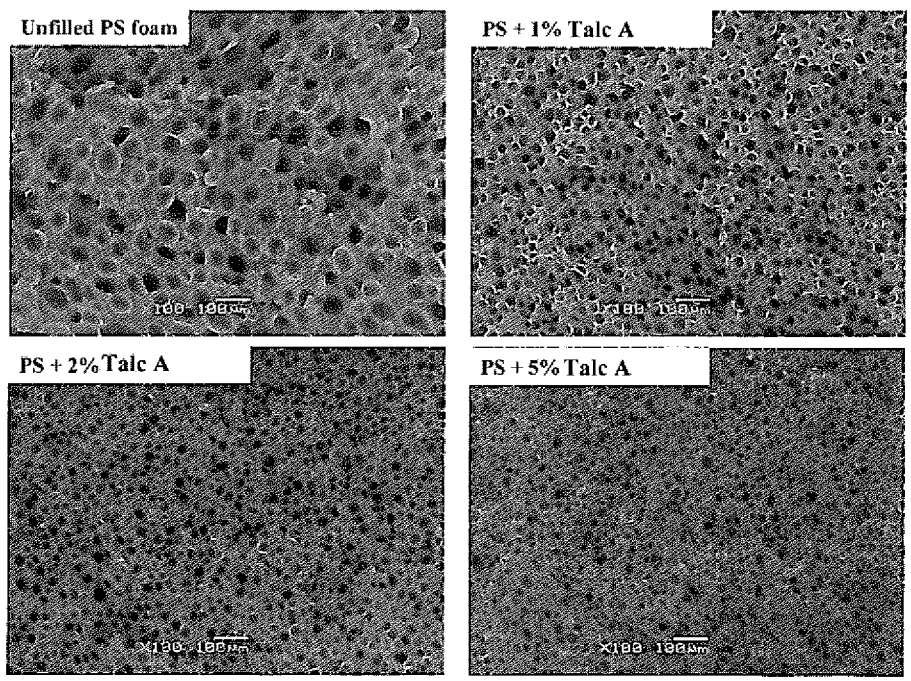
Figure 52A:
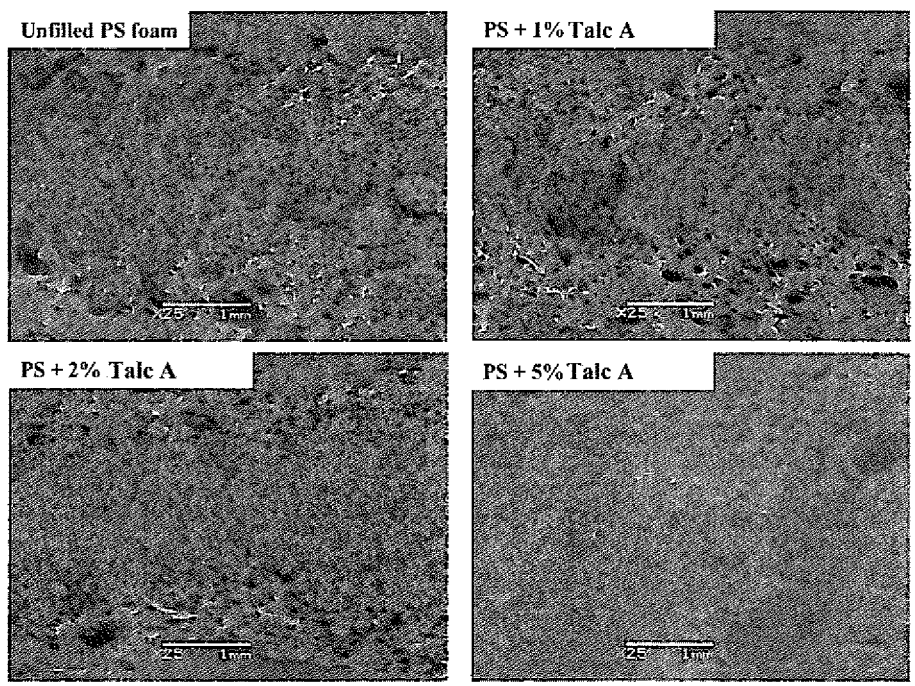
Figure 52B:
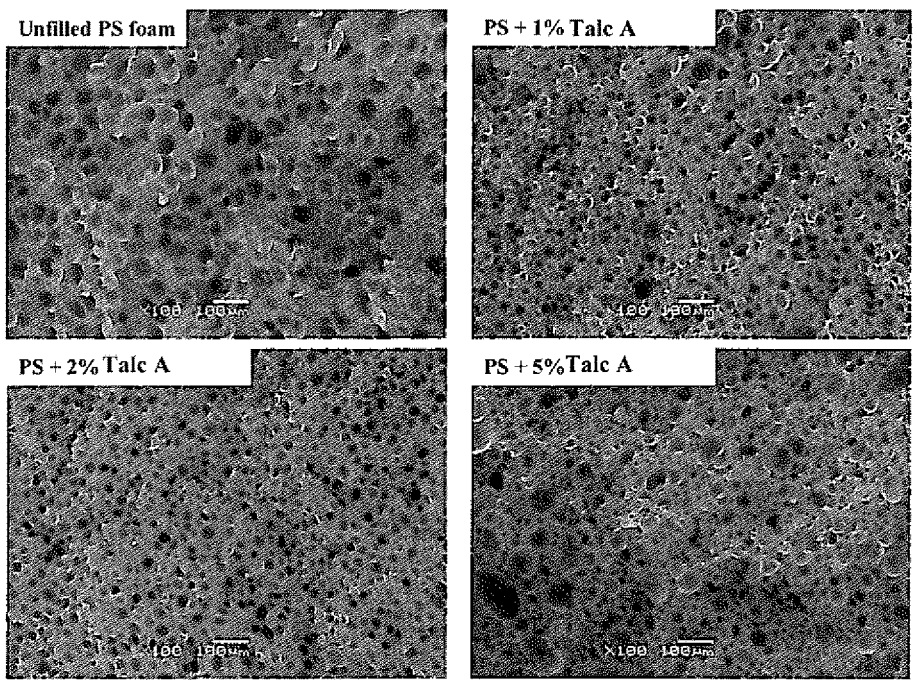
Figure 53A:
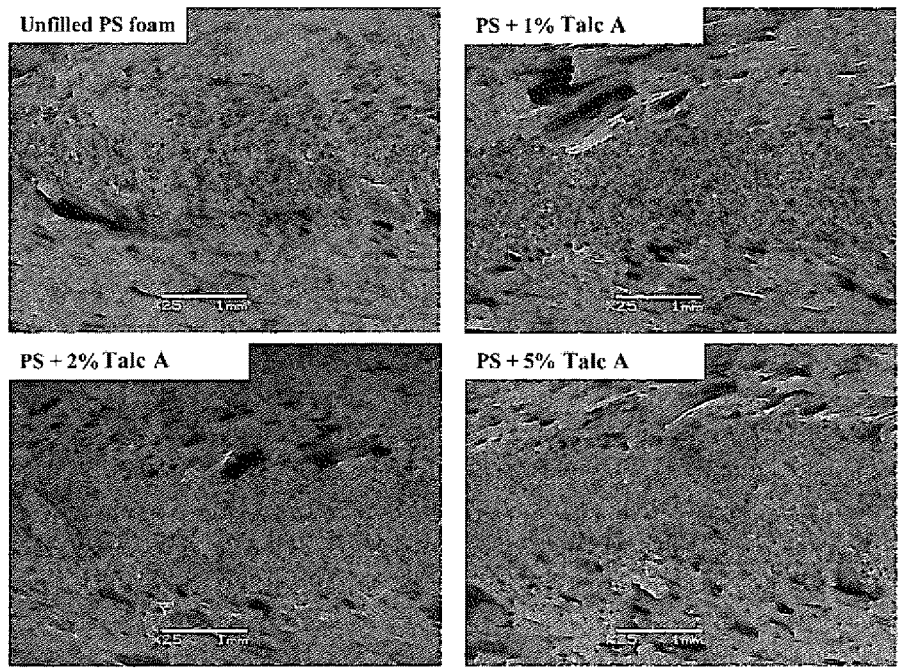
Figure 53B:
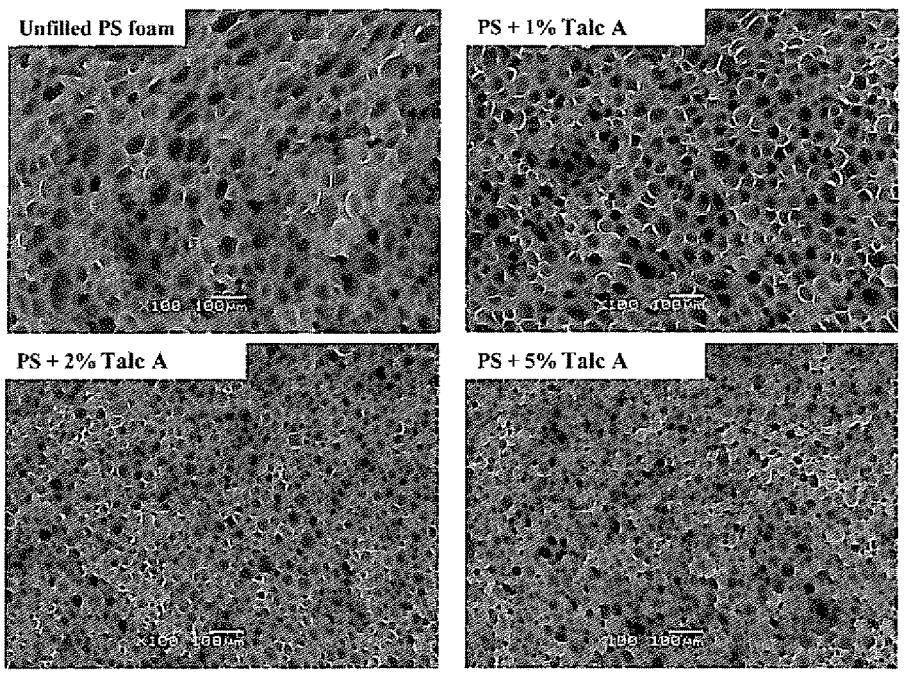
Figure 54A:
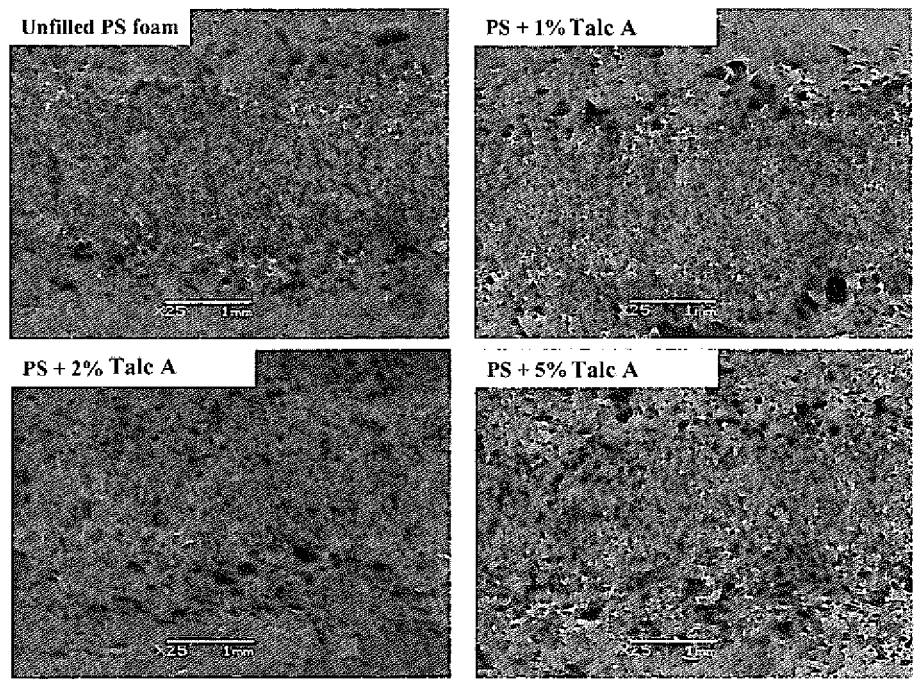
Figure 54B:
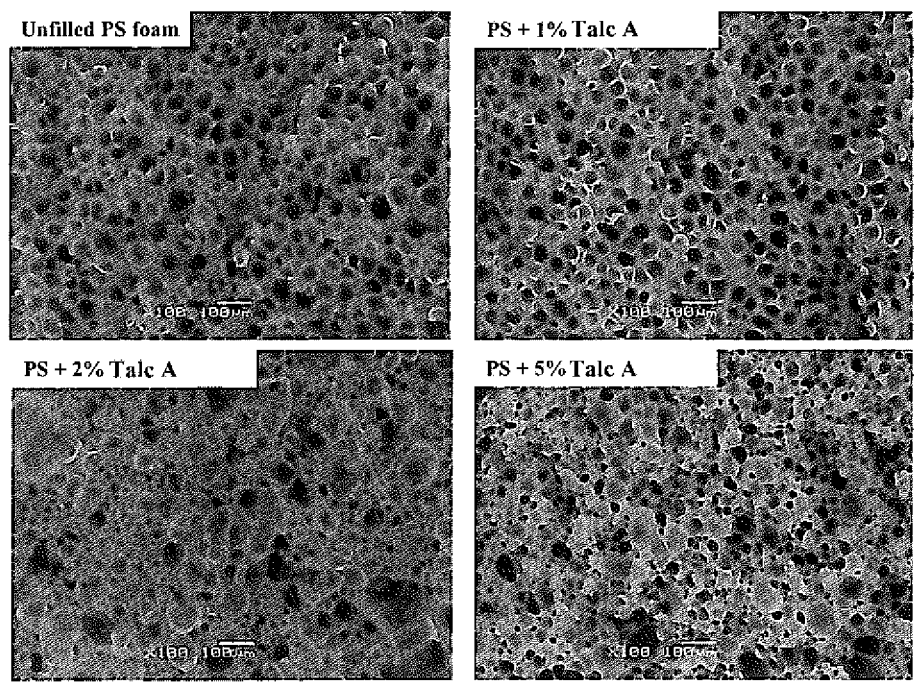
Figure 55A:
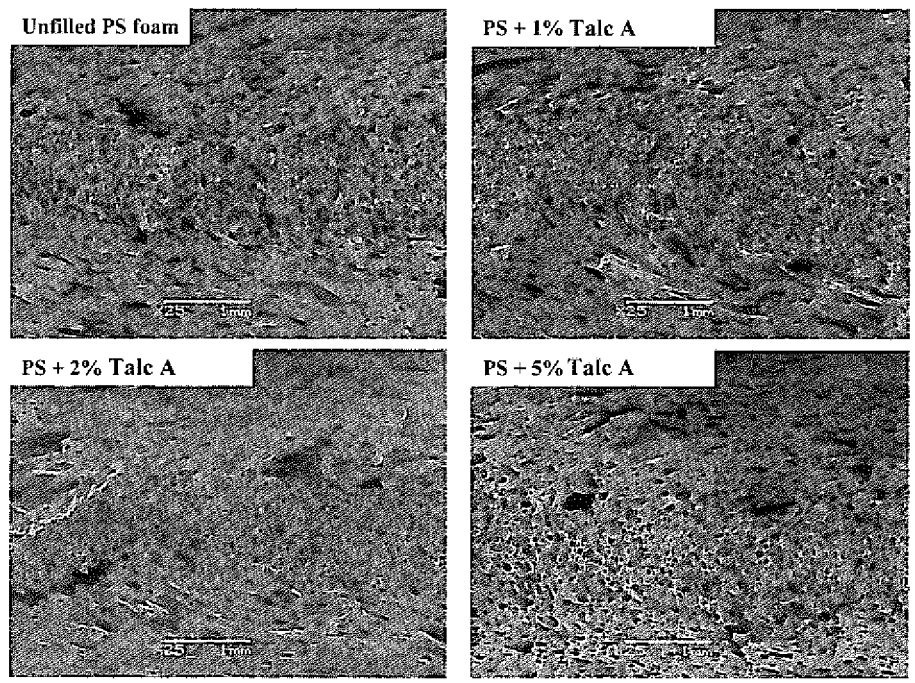
Figure 55B:
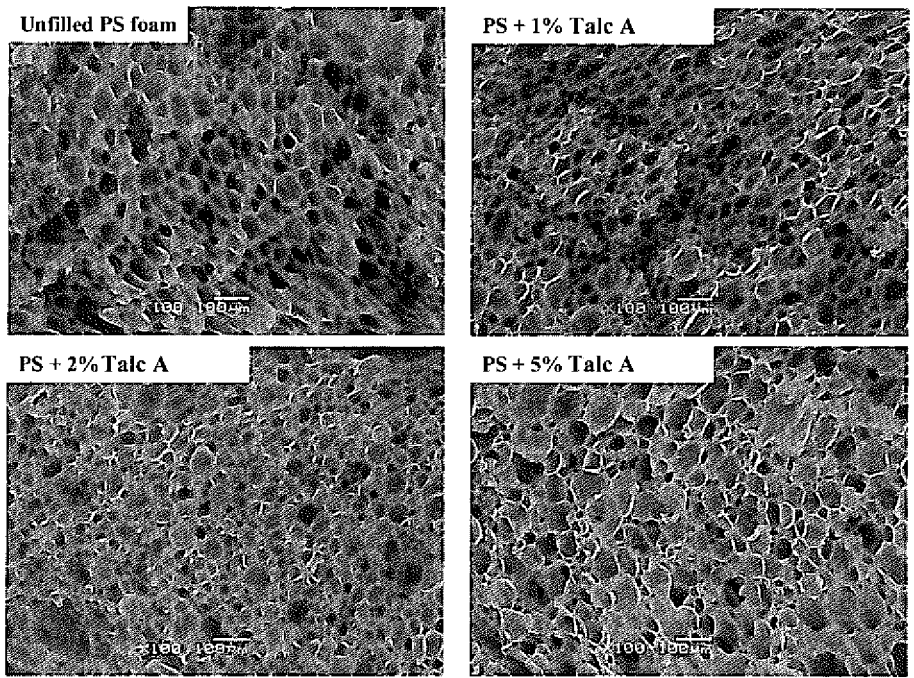
Figure 56A:
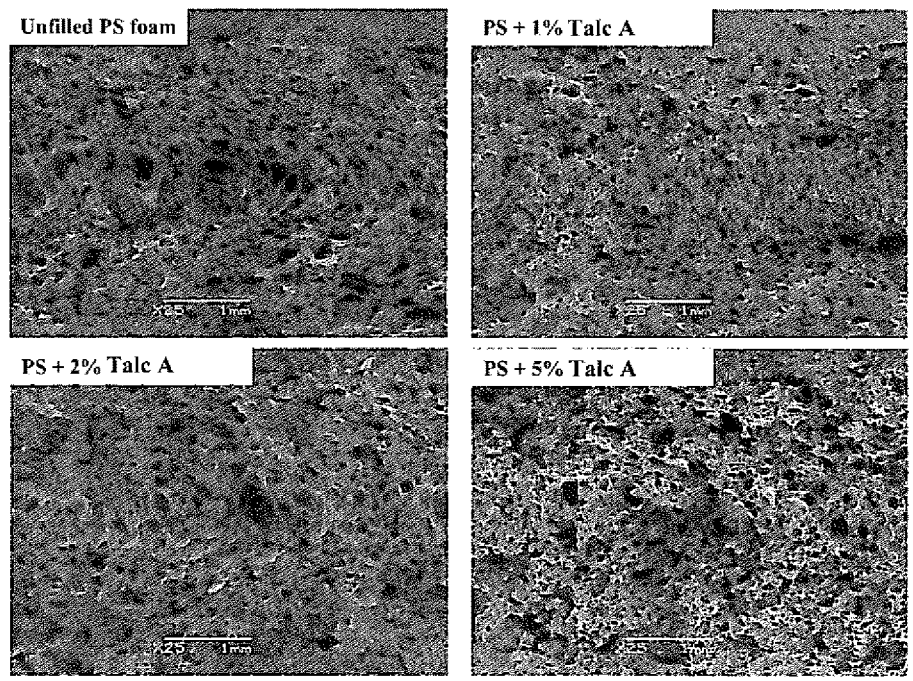
Figure 56B:
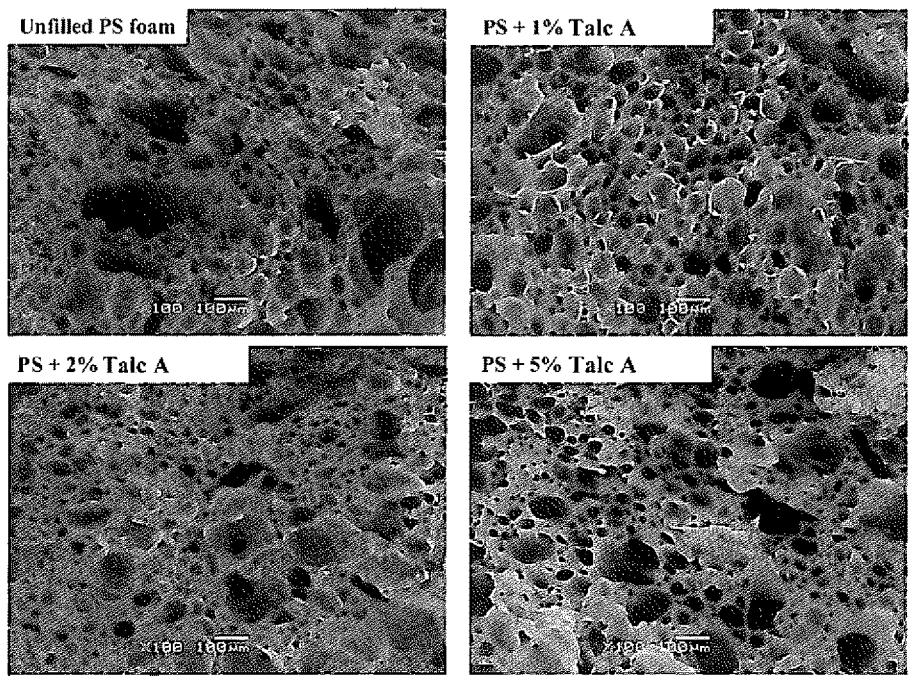

FIG. 33 shows the effect of talc incorporation and concentration on the cell structure. In the case of weight reduction of 15 to 16% (Examples 8, 12 and 16), it is clearly visible that a high cell nucleation effect is obtained when the amount of talc is increased. Although in some specific cases increasingly higher concentrations of talc led to foams with even higher cell densities, the biggest differences were found between the unfilled polypropylene foams and the ones with microcrystalline talc.

The foams produced according to the single-step injection-moulding foaming process were analysed by DMTA characterisation as described above. The skins of the samples formed during foaming were retained as opposed to the two step foaming process. These measurements were also taken both in the flow direction (FD) and the transverse direction (TD), see FIG. 22. The results and extrapolated n values are shown in Tables 14 and 15:

TABLE 14

DMTA-characterisation in the flow direction (FD) of the polypropylene-talc foams produced according to the single-step injection-moulding foaming process:

| Material | Example | E' at 30° C. (MPa) | E'$_{spec}$ at 30° C. (MPa · cm$^3$ · g$^{-1}$) | n |
|---|---|---|---|---|
| Unfilled polypropylene | (Solid) | 992.7 | 1148.6 | 1.61 |
| | Comp. 13 | 717.0 | 926.8 | |
| | Comp. 14 | 530.4 | 790.8 | |
| | Comp. 15 | 469.7 | 776.0 | |
| | Comp. 16 | 450.4 | 810.7 | |
| polypropylene + 1 wt.-% Talc A | (Solid) | 1022.0 | 1159.0 | 1.77 |
| | 8 | 707.3 | 947.6 | |
| | 9 | 557.4 | 859.0 | |
| | 10 | 589.1 | 1005.8 | |
| | 11 | 422.0 | 787.6 | |
| polypropylene + 2 wt.-% Talc A | (Solid) | 1102.0 | 1247.0 | 1.39 |
| | 12 | 736.6 | 984.3 | |
| | 13 | 645.3 | 993.5 | |
| | 14 | 488.0 | 835.3 | |
| | 15 | 458.7 | 853.2 | |
| polypropylene + 5 wt.-% Talc A | (Solid) | 1237.0 | 1366.2 | 1.24 |
| | 16 | 799.5 | 1052.7 | |
| | 17 | 605.9 | 911.4 | |
| | 18 | 526.1 | 877.9 | |
| | 19 | 446.8 | 817.6 | |

TABLE 15

DMTA-characterisation in the transverse direction (TD) of the polypropylene-talc foams produced according to the single-step injection-moulding foaming process:

| Material | Example | E' at 30° C. (MPa) | E'$_{spec}$ at 30° C. (MPa · cm$^3$ · g$^{-1}$) | n |
|---|---|---|---|---|
| Unfilled polypropylene | (Solid) | 1017.0 | 1176.7 | 1.61 |
| | Comp. 13 | 690.4 | 892.4 | |
| | Comp. 14 | 536.6 | 800.1 | |
| | Comp. 15 | 493.5 | 815.4 | |
| | Comp. 16 | 392.3 | 706.1 | |
| polypropylene + 1 wt.-% Talc A | (Solid) | 1037.0 | 1176.0 | 1.77 |
| | 8 | 617.2 | 826.9 | |
| | 9 | 557.3 | 858.9 | |
| | 10 | 429.0 | 732.5 | |
| | 11 | 346.2 | 646.2 | |
| polypropylene + 2 wt.-% Talc A | (Solid) | 1104.0 | 1249.2 | 1.39 |
| | 12 | 682.4 | 911.8 | |
| | 13 | 489.9 | 754.2 | |
| | 14 | 419.3 | 717.7 | |
| | 15 | 443.8 | 825.5 | |
| polypropylene + 5 wt.-% Talc A | (Solid) | 1202.0 | 1327.5 | 1.24 |
| | 16 | 667.5 | 878.9 | |
| | 17 | 612.9 | 921.9 | |
| | 18 | 534.0 | 891.1 | |
| | 19 | 440.9 | 806.8 | |

The data shows that the E'$_{spec}$-values of the unfoamed composites increased with increasing talc loadings. Generally speaking, E'$_{spec}$-values decreased with decreasing relative density (i.e., with increasing weight reduction). Furthermore, polypropylene foams with talc displayed higher E'$_{spec}$-values than the respective unfilled polypropylene foams, in particular in the flow direction (FD). It is believed that this effect is related to a combination of a finer cellular structure and mechanical reinforcement of the foams effect due to the talc.

Though there is not a global tendency in terms of mechanical properties with increasing the amount of talc, polypropylene foams with 2% and 5% Talc A (Examples 12 to 19) present improved mechanical behaviour in the transverse direction with foaming, as assessed by their lower values of Gibson-Ashby's exponent n. This implies a slower deterioration of mechanical properties in foaming with increasing the amount of microcrystalline talc in the foamed polypropylene composites.

Equivalent tests were carried out using polystyrene foams instead of polypropylene foams. The production of foamed polystyrene was also carried out using foaming by injection-moulding physical foaming known as the Mucell® foaming process. Polystyrene atactic homopolymer "Polystyrol 165H", provided by BASF, was foamed using supercritical $N_2$ (0.7 to 0.8 wt.-%) as the physical blowing agent, to obtain square plates of dimensions 10 cm×10 cm×5 mm. The talc incorporated was Talc A (see Table 2), in concentrations of 1, 2 and 5 wt.-%. The composites were produced by initial preparation of a polystyrene-talc masterbatch comprising 10 wt.-% Talc A with subsequent dilution of the masterbatch to obtain the desired concentrations.

The temperatures of the injection unit during the injection-moulding foaming Mucell® process are shown in Table 16. The counter back-pressure during injection is 20 MPa, the mould temperature 20° C. and the cooling time inside the mould 45 to 50 s.

TABLE 16

Injection unit temperatures

| Zone | Temperature (° C.) |
|---|---|
| 1 | 215 |
| 2 | 220 |
| 3 | 220 |
| 4 | 220 |
| 5 | 230 |
| (injection temperature) | |

Various foams were produced using the above described process. Polymer dosages and injection speeds are presented in Table 17:

TABLE 17

Polymer dosages and injection speeds

| Condition | Final weight reduction (%) | Polymer dosage (cm³) | Polymer injection speed (m · s⁻¹) |
|---|---|---|---|
| Solid | — | 65.0 | 0.400 |
| Foam 1 | 15 to 16 | 47.0 | 0.240 |
| Foam 2 | 27 to 28 | 40.5 | 0.180 |
| Foam 3 | 35 | 36.5 | 0.120 |
| Foam 4 | 40 | 33.5 | 0.090 |

The various foams produced from the polystyrene comprising 1, 2 and 5 wt.-% Talc A, and their unfoamed equivalents had the densities shown in Table 18. The densities were measured according to ISO 845.

TABLE 18

Densities of unfoamed and foamed polypropylenes:

| Example | Material | Foam code | Density (g · cm⁻³) | Relative density | Weight reduction (%) |
|---|---|---|---|---|---|
| — | Unfilled polystyrene | Solid | 1.022 | 1 | 0 |
| Comp. 17 | | Foam 1 | 0.863 | 0.84 | 15.6 |
| Comp. 18 | | Foam 2 | 0.739 | 0.72 | 27.7 |
| Comp. 19 | | Foam 3 | 0.671 | 0.66 | 34.4 |
| Comp. 20 | | Foam 4 | 0.608 | 0.60 | 40.5 |
| — | polystyrene + 1 wt.-% Talc A | Solid | 1.031 | 1 | 0 |
| 20 | | Foam 1 | 0.870 | 0.85 | 15.7 |
| 21 | | Foam 2 | 0.749 | 0.73 | 27.4 |
| 22 | | Foam 3 | 0.668 | 0.65 | 35.2 |
| 23 | | Foam 4 | 0.621 | 0.61 | 39.8 |
| — | polystyrene + 2 wt.-% Talc A | Solid | 1.035 | 1 | 0 |
| 24 | | Foam 1 | 0.875 | 0.86 | 15.4 |
| 25 | | Foam 2 | 0.750 | 0.73 | 27.6 |
| 26 | | Foam 3 | 0.673 | 0.66 | 34.9 |
| 27 | | Foam 4 | 0.616 | 0.60 | 40.5 |
| — | polystyrene + 5 wt.-% Talc A | Solid | 1.068 | 1 | 0 |
| 28 | | Foam 1 | 0.903 | 0.88 | 15.5 |
| 29 | | Foam 2 | 0.770 | 0.75 | 27.9 |
| 30 | | Foam 3 | 0.693 | 0.68 | 35.1 |
| 31 | | Foam 4 | 0.638 | 0.62 | 40.3 |

Foam Characterisation:

The cellular structure of the various polystyrene foams was analysed and assessed in the same way as for the polypropylene foams above. The cellular structures of the various polystyrene foams produced according to the two-step extrusion-mixing and foaming process were measured according to the above mentioned procedure and are shown in Tables 19 and 20:

TABLE 19

Cellular structures in the flow direction (FD) of polystyrene-talc foams produced according to the single-step injection-moulding foaming process:

| Example | Relative density | $\varphi_{FD}$ (μm) | $\Phi_{WD}$ (μm) | $N_f$ (cells · cm⁻³) | FIG. |
|---|---|---|---|---|---|
| Comp. 17 | 0.84 | 58.8 | 83.0 | 1.45 × 10⁶ | 41, 49 |
| Comp. 18 | 0.72 | 52.3 | 52.8 | 4.04 × 10⁶ | 41, 51 |
| Comp. 19 | 0.66 | 48.7 | 48.3 | 9.03 × 10⁶ | 41, 53 |
| Comp. 20 | 0.60 | 50.9 | 43.3 | 1.47 × 10⁷ | 41, 55 |
| 20 | 0.85 | 26.7 | 25.1 | 1.78 × 10⁷ | 43, 49 |
| 21 | 0.73 | 28.0 | 27.2 | 3.26 × 10⁷ | 43, 51 |
| 22 | 0.65 | 38.6 | 37.8 | 1.67 × 10⁷ | 43, 53 |
| 23 | 0.61 | 34.4 | 39.6 | 2.71 × 10⁷ | 43, 55 |
| 24 | 0.86 | 15.0 | 15.6 | 6.55 × 10⁷ | 45, 49 |
| 25 | 0.73 | 25.4 | 24.7 | 3.79 × 10⁷ | 45, 51 |
| 26 | 0.66 | 27.0 | 24.9 | 6.01 × 10⁷ | 45, 53 |
| 27 | 0.60 | 43.4 | 41.3 | 3.03 × 10⁷ | 45, 55 |
| 28 | 0.88 | 12.2 | 12.1 | 1.19 × 10⁸ | 47, 49 |
| 29 | 0.75 | 19.1 | 18.1 | 9.43 × 10⁷ | 47, 51 |
| 30 | 0.68 | 22.1 | 19.4 | 1.00 × 10⁸ | 47, 53 |
| 31 | 0.62 | 61.4 | 53.3 | 1.77 × 10⁷ | 47, 55 |

TABLE 20

Cellular structures in the transversal direction (TD) of polystyrene-talc foams produced according to the single-step injection-moulding foaming process:

| Example | Relative density | $\varphi_{FD}$ (μm) | $\Phi_{WD}$ (μm) | $N_f$ (cells · cm⁻³) | FIG. |
|---|---|---|---|---|---|
| Comp. 17 | 0.84 | 89.2 | 84.9 | 6.10 × 10⁵ | 42, 50 |
| Comp. 18 | 0.72 | 50.2 | 45.4 | 7.01 × 10⁶ | 42, 52 |
| Comp. 19 | 0.66 | 45.8 | 43.0 | 1.03 × 10⁷ | 42, 54 |
| Comp. 20 | 0.60 | 48.7 | 56.6 | 1.17 × 10⁷ | 42, 56 |
| 20 | 0.85 | 30.5 | 30.1 | 1.06 × 10⁷ | 44, 50 |
| 21 | 0.73 | 28.1 | 26.7 | 3.81 × 10⁷ | 44, 52 |
| 22 | 0.65 | 41.8 | 40.6 | 1.31 × 10⁷ | 44, 54 |
| 23 | 0.61 | 52.0 | 50.0 | 1.66 × 10⁷ | 44, 56 |
| 24 | 0.86 | 16.2 | 17.7 | 5.31 × 10⁷ | 46, 50 |
| 25 | 0.73 | 26.7 | 25.7 | 3.21 × 10⁷ | 46, 52 |
| 26 | 0.66 | 48.8 | 42.2 | 2.46 × 10⁷ | 46, 54 |
| 27 | 0.60 | 46.8 | 52.4 | 1.89 × 10⁷ | 46, 56 |
| 28 | 0.88 | 12.4 | 12.0 | 1.06 × 10⁸ | 48, 50 |
| 29 | 0.75 | 28.4 | 24.5 | 6.62 × 10⁷ | 48, 52 |
| 30 | 0.68 | 31.9 | 24.0 | 5.65 × 10⁷ | 48, 54 |
| 31 | 0.62 | 51.0 | 53.2 | 2.09 × 10⁷ | 48, 56 |

The cellular structures of the various foams produced according to the single step injection moulding foaming process are shown in FIGS. 41 to 58c.

As can be seen, the incorporation of talc resulted in foams with lower average cell sizes. In the unfilled polystyrene foams 2 to 4 (Comparative Examples 18 to 20) the cell sizes φ in all directions were between approximately 50 μm and 60 μm and the cell number below or around 10⁷ cells·cm⁻³. The unfilled polystyrene foam 1 (Comparative Example 17) presented clearly higher cell sizes in both the FD and TD direction, of approximately 85 μm and 90 μm, with a cell number below 10⁶ cells·cm⁻³. It is thought that this is due to the lower proportion of blowing agent and a less effective cell nucleation. In the case of the unfilled polystyrene foams, the cell density increased with higher foaming efficiency.

Figure 57:
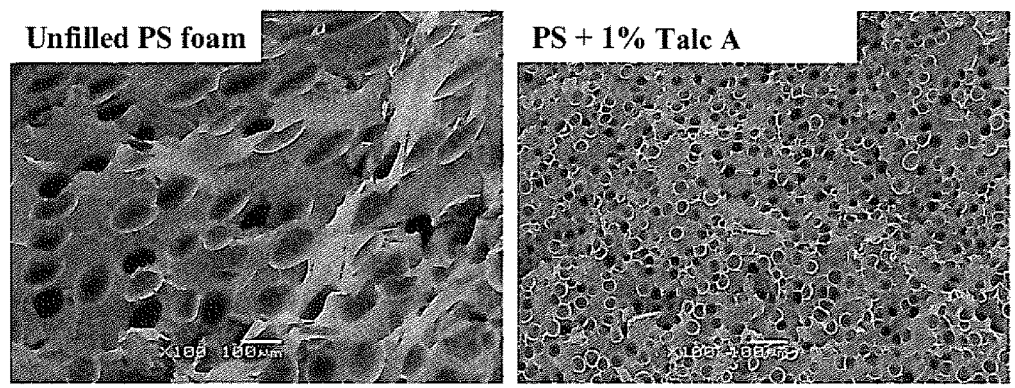
Figure 58A:
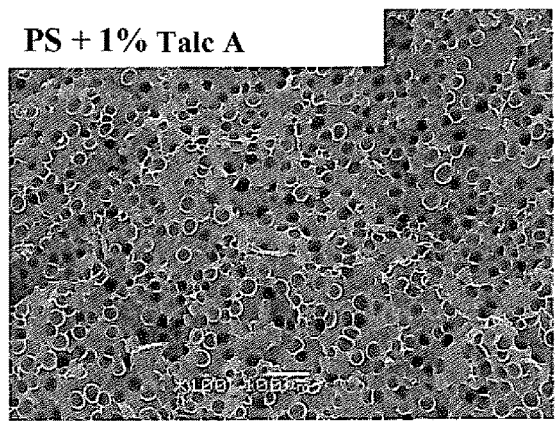
Figure 58B:
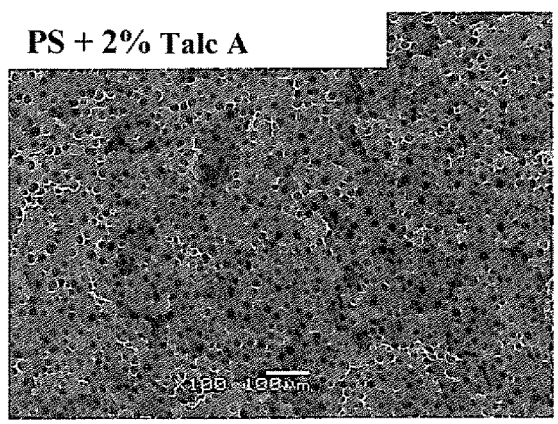
Figure 58C:
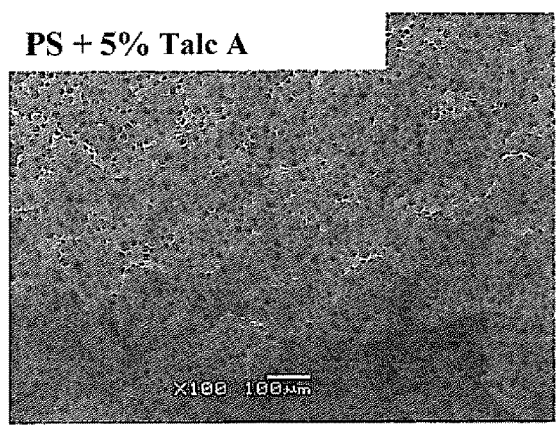

Among the nucleated polystyrene foams, the differences between the various talc concentrations were not significant. However, it can be seen that higher talc loadings lead to generally increased $N_f$-values for the cell concentrations. The incorporation of talc clearly reduced the cell sizes in both directions, promoting the formation of foams with much higher cell densities. The detected cell sizes were below 50 µm, in some cases even below 20 µm; the cell density was above $10^7$ cells·cm$^{-3}$, in some cases even above $10^8$ cells·cm$^{-3}$. Furthermore, the difference between the cell sizes in the flow direction (FD) and the transversal direction (TD) is relatively lower, compared to the non-nucleated foams, and the cell aspect ratios are closer to 1, meaning that the foams are more isotropic. The influence of the flow direction on the foaming is lower and hence more dimensionally uniform ("symmetrical") foams can be obtained. This is also illustrated in FIG. 57.

Significant differences were also observed when increasing the amount of talc, with foams displaying lower cell sizes and higher cell densities. There is clearly a higher cell nucleation effect with increasing the talc concentration. The cell size reduction and cell density increase is particularly pronounced with increasing the amount of talc for foam weight reductions of 16 and 28% (see FIGS. 58a to 58c), leading to the conclusion that the cell nucleation induced by talc is more effective at lower weight reductions.

The polystyrene foams produced according to the single-step injection-moulding foaming process were also analysed by DMTA characterisation as described above. The skins of the samples formed during foaming were retained as opposed to the two-step foaming process. These measurements were also taken both in the flow direction (FD) and the transverse direction (TD). The results are shown in Tables 21 and 22:

TABLE 21

DMTA-characterisation in the flow direction (FD) of the polystyrene-talc foams produced according to the single-step injection-moulding foaming process:

| Material | Example | E' at 30° C. (MPa) | E'$_{spec}$ at 30° C. (MPa · cm$^3$ · g$^{-1}$) | Reduction (%) |
|---|---|---|---|---|
| Unfilled polystyrene | (Solid) | 2082.0 | 2036.9 | — |
| | Comp. 17 | 1530.0 | 1773.3 | 12.9 |
| | Comp. 18 | 1311.0 | 1774.3 | 12.9 |
| | Comp. 19 | 1079.0 | 1608.9 | 21.0 |
| | Comp. 20 | 875.0 | 1438.5 | 29.4 |
| polystyrene + 1 wt.-% Talc A | (Solid) | 2145.0 | 2080.4 | — |
| | 20 | 1629.0 | 1873.4 | 9.9 |
| | 21 | 1284.0 | 1714.8 | 17.6 |
| | 22 | 1065.0 | 1594.2 | 23.4 |
| | 23 | 905.7 | 1459.1 | 29.9 |
| polystyrene + 2 wt.-% Talc A | (Solid) | 2102.0 | 2030.4 | — |
| | 24 | 1719.0 | 1963.7 | 3.3 |
| | 25 | 1310.0 | 1746.9 | 14.0 |
| | 26 | 1105.0 | 1640.8 | 19.2 |
| | 27 | 946.8 | 1537.7 | 24.3 |
| polystyrene + 5 wt.-% Talc A | (Solid) | 2316.0 | 2168.3 | — |
| | 28 | 1718.0 | 1902.7 | 12.2 |
| | 29 | 1274.0 | 1653.7 | 23.7 |
| | 30 | 1096.0 | 1580.5 | 27.1 |
| | 31 | 894.8 | 1402.5 | 35.3 |

TABLE 22

DMTA-characterisation in the transverse direction (TD) of the polystyrene-talc foams produced according to the single-step injection-moulding foaming process:

| Material | Example | E' at 30° C. (MPa) | E'$_{spec}$ at 30° C. (MPa · cm$^3$ · g$^{-1}$) | Reduction (%) |
|---|---|---|---|---|
| Unfilled polystyrene | (Solid) | 2161.0 | 2114.2 | — |
| | Comp. 17 | 1594.0 | 1847.5 | 12.6 |
| | Comp. 18 | 1292.0 | 1748.5 | 17.3 |
| | Comp. 19 | 1164.0 | 1735.6 | 17.9 |
| | Comp. 20 | 957.4 | 1573.9 | 25.6 |

TABLE 22-continued

DMTA-characterisation in the transverse direction (TD) of the polystyrene-talc foams produced according to the single-step injection-moulding foaming process:

| Material | Example | E' at 30° C. (MPa) | E'$_{spec}$ at 30° C. (MPa · cm$^3$ · g$^{-1}$) | Reduction (%) |
|---|---|---|---|---|
| polystyrene + 1 wt.-% Talc A | (Solid) | 2194.0 | 2127.9 | — |
| | 20 | 1689.0 | 1942.5 | 8.7 |
| | 21 | 1365.0 | 1823.0 | 14.3 |
| | 22 | 1222.0 | 1829.2 | 14.0 |
| | 23 | 951.6 | 1533.1 | 28.0 |
| polystyrene + 2 wt.-% Talc A | (Solid) | 2114.0 | 2042.0 | — |
| | 24 | 1682.0 | 1921.5 | 5.9 |
| | 25 | 1330.0 | 1773.6 | 13.1 |
| | 26 | 1183.0 | 1756.7 | 14.0 |
| | 27 | 1039.0 | 1687.5 | 17.4 |
| polystyrene + 5 wt.-% Talc A | (Solid) | 2286.0 | 2140.2 | — |
| | 28 | 1758.0 | 1947.0 | 9.0 |
| | 29 | 1376.0 | 1786.1 | 16.5 |
| | 30 | 1259.0 | 1815.6 | 15.2 |
| | 31 | 1023.0 | 1603.7 | 25.1 |

The data shows that the E'$_{spec}$-values of the unfoamed composites increased with increasing talc loadings in both foaming direction and transversal direction. Generally speaking, E'$_{spec}$-values decreased with decreasing relative density (i.e., with increasing weight reduction). Furthermore, polystyrene foams with talc displayed higher E'$_{spec}$-values than the respective unfilled polystyrene foams, in particular for the weight reductions of 16% and 28%. It is believed that this effect is related to their much finer cellular structure, which was induced by the talc particles.

Polystyrene foams with talc presented lower reductions of the specific storage modulus values with foaming when compared to the respective unfilled polystyrene foams. Once again, the biggest differences were found for foam weight reductions of 16% and 28%, where cell nucleation induced by talc was more effective. In particular, the use of 2 wt.-% talc as the nucleating agent in the polystyrene foams appears to have the best improvements.

The invention claimed is:

1. A polymer-based foam composition comprising:
   a polymer, wherein the polymer is a polypropylene polymer or a polystyrene polymer; and
   from 0.5 wt. % to 1.7 wt. % talc particles, based on the total weight of the composition, wherein the talc particles comprise microcrystalline talc;
   wherein the polymer-based foam composition has an average cell size of φ=150 µm or less in at least one of a vertical direction ($\varphi_{VD}$) and a width direction ($\varphi_{WD}$).

2. The polymer-based foam composition according to claim 1, wherein the polypropylene polymer is a polypropylene homopolymer.

3. The polymer-based foam composition according to claim 1, wherein the polymer is the major component of the composition.

4. The polymer-based foam composition according to claim 1, wherein the microcrystalline talc has an average particle size $d_{50}$ by Sedigraph of 0.5 to 10 µm.

5. The polymer-based foam composition according to claim 1, wherein the microcrystalline talc has an aspect ratio according to Jennings theory of between 9 and 15.

6. The polymer-based foam composition according to claim 1, wherein the microcrystalline talc has a surface BET area of 5 to 25 m$^2$/g.

7. The polymer-based foam composition according to claim 1, wherein the polymer-based foam composition has a ratio $\varphi_{VD}/\varphi_{WD}$ of the average cell size in the vertical direction $\varphi_{VD}$ to the average cell size in the width direction $\varphi_{WD}$ of 0.7 or more.

8. The polymer-based foam composition according to claim 1, wherein the polymer-based foam composition contains $N_f=10^5$ or more cells per cm$^3$.

9. The polymer-based foam composition according to claim 1, produced by a two-step extrusion-mixing and foaming process.

10. The polymer-based foam composition according to claim 1, produced by a single-step injection-moulding foaming process.

11. A product comprising the polymer-based foam composition according to claim 1.

12. A method of formation of the polymer-based foam composition as defined in claim 1, the method comprising:
    providing a polymer composition, wherein the polymer composition is a polypropylene polymer composition or a polystyrene polymer composition;
    providing a microcrystalline talc product in an amount of 0.5 wt. % to 1.7 wt. % based on the total weight of the composition;
    introducing the microcrystalline talc product into the polymer composition in an extrusion-mixing process; and
    foaming the polymer composition using a gas comprising at least one of $CO_2$, nitrogen, and a noble gas; wherein the polymer-based foam composition has an average cell size of $\varphi=150$ μm or less in at least one of a vertical direction ($\varphi_{VD}$) and a width direction ($\varphi_{WD}$).

13. A method of formation of the polymer-based foam composition as defined in claim 1, the method comprising:
    providing a polymer composition wherein the polymer composition is a polypropylene polymer composition or a polystyrene polymer composition;
    providing a microcrystalline talc product in an amount of 0.5 wt. % to 1.7 wt. % based on the total weight of the composition; and
    introducing the microcrystalline talc product into the polymer composition; and
    foaming the composition using a single-step injection moulding foaming process; wherein the polymer-based foam composition has an average cell size of $\varphi=150$ μm or less in at least one of a vertical direction ($\varphi_{VD}$) and a width direction ($\varphi_{WD}$).

14. The product of claim 11, wherein the product is at least one of a packaging, a food packaging product, a plastic part for automotive vehicles, a thermal and/or noise insulation foam, a pipe, a consumer good, or an appliance.

* * * * *